(12) United States Patent  (10) Patent No.: US 7,740,254 B2
Takemura et al.  (45) Date of Patent: Jun. 22, 2010

(54) WHEELED WORK MACHINE

(75) Inventors: Toshihiko Takemura, Izumi (JP);
Ryohei Sumiyoshi, Sakai (JP); Kunihiro Suzuki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/088,026

(22) PCT Filed: Sep. 7, 2006

(86) PCT No.: PCT/JP2006/317750
§ 371 (c)(1),
(2), (4) Date: Aug. 20, 2008

(87) PCT Pub. No.: WO2007/037107
PCT Pub. Date: Apr. 5, 2007

(65) Prior Publication Data
US 2009/0066046 A1   Mar. 12, 2009

(30) Foreign Application Priority Data
Sep. 29, 2005  (JP) ............... 2005-283377
Sep. 29, 2005  (JP) ............... 2005-283378

(51) Int. Cl.
 *B60G 3/08* (2006.01)
(52) U.S. Cl. ............................................. 280/124.111
(58) Field of Classification Search .......... 280/124.111, 280/124.112, 124.113, 124.116, 124.11
See application file for complete search history.

(56) References Cited

U.S. PATENT DOCUMENTS

| | | | |
|---|---|---|---|
| 4,393,959 A | 7/1983 | Acker | |
| 5,161,353 A * | 11/1992 | Bergkamp et al. | 56/6 |
| 6,641,152 B1 | 11/2003 | Suzuki | |
| 6,990,757 B2 | 1/2006 | Takemura et al. | |
| 7,464,955 B2 * | 12/2008 | Ahlberg et al. | 280/474 |
| 7,510,198 B2 * | 3/2009 | Rach et al. | 280/124.112 |

FOREIGN PATENT DOCUMENTS

| | | |
|---|---|---|
| EP | 0803384 A | 10/1997 |
| JP | 58-167400 A | 10/1983 |
| JP | 5-10048 Y2 | 3/1993 |
| JP | 6-52405 U | 7/1994 |
| JP | 2559294 Y2 | 9/1997 |
| JP | 2001047829 A | 2/2001 |
| JP | 2005-061050 A | 10/2005 |

* cited by examiner

*Primary Examiner*—Faye M. Fleming
(74) *Attorney, Agent, or Firm*—The Webb Law Firm

(57) ABSTRACT

A wheeled work machine in which the center of gravity of a machine body is positioned low and the stability of the machine in a working position is secured without regard to the movement of the center of gravity caused by the rotation of a rotation table during work. An operation body (111) integrally rocking with a front axle case (96) is provided at the center in the left-right direction of the front axle case (96), and a rocking lock mechanism (112) for limiting the rocking of the operation body (111) is provided at a machine body frame (6). The rocking lock mechanism (112) has a lock cylinder (115) in which a piston rod (120) is horizontally fixed to the machine frame (6) and a switchover valve (118) for switching two oil chambers (124A, 124B) of the lock cylinder (115) between a communicated state and a closed state. A cylinder tube (116) of the lock cylinder (115) is operably connected to the operation body (111).

6 Claims, 31 Drawing Sheets

Fig.29
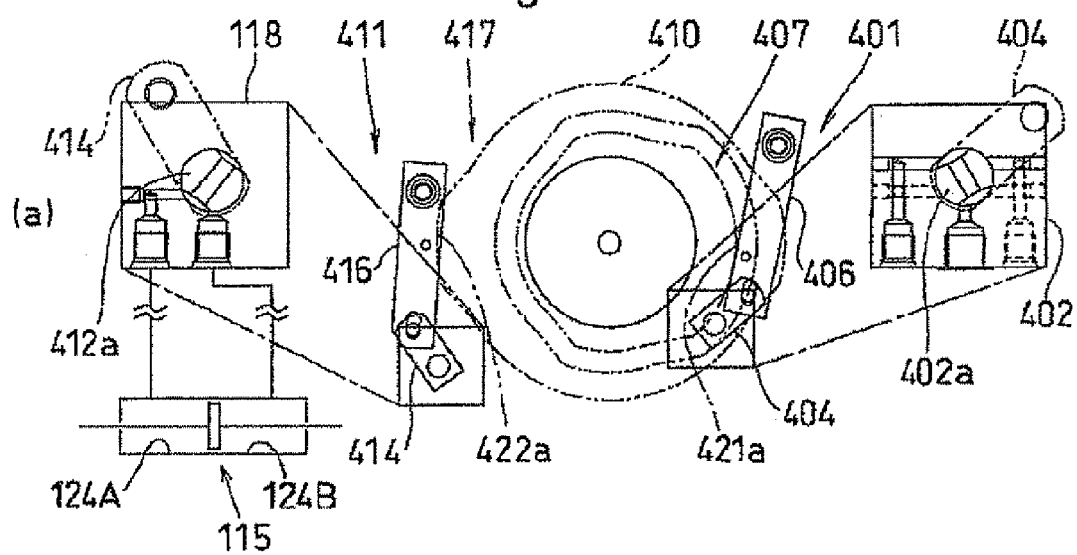
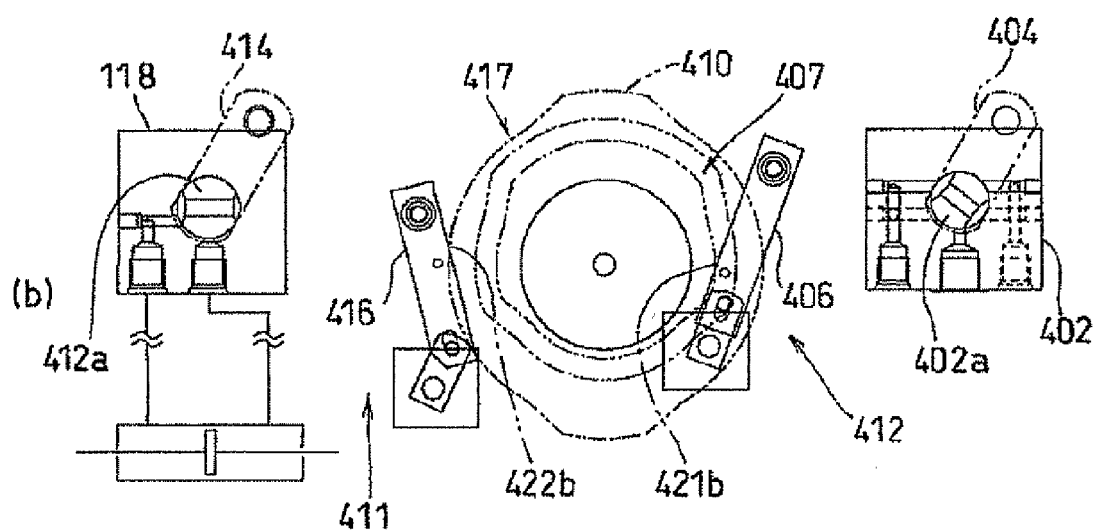
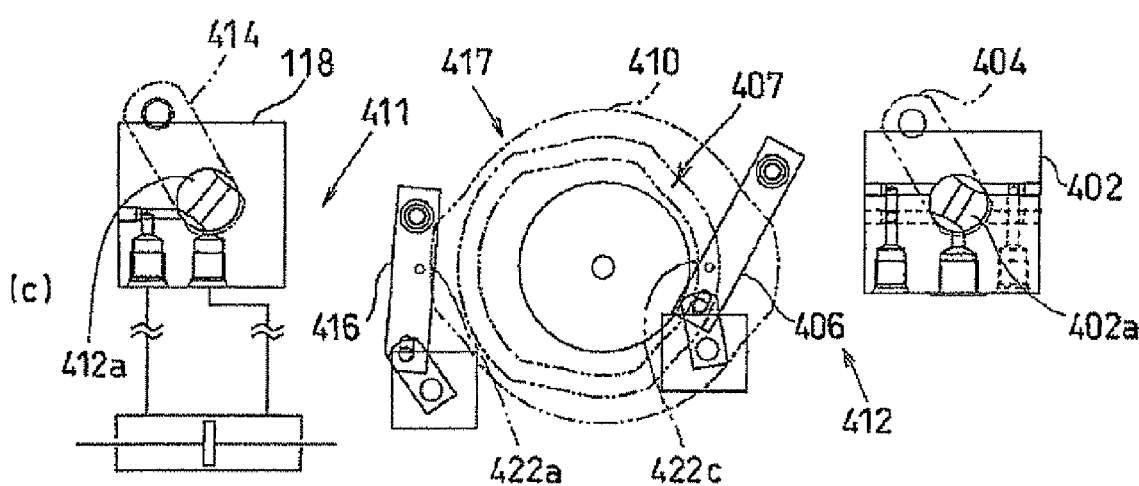

WHEELED WORK MACHINE

TECHNICAL FIELD

The present invention relates to a wheeled work machine.

BACKGROUND ART

Conventional wheeled work machines include those in which a rotation table is provided via a rotation bearing on a traveling body that has left and right front wheels and rear wheels as well as an engine and a power transmission mechanism, and in which a driver seat and a ground implement having an attachment tool capable of raising and lowering are provided on the rotation table (see Patent Document 1).

This wheeled work machine may be configured so that travel during raising and lowering is enabled even in stairs and other locations having severe surface irregularity, a front axle case for supporting the pair of left and right front wheels is pivotably supported by the machine frame so as to be able to rock, and a rocking lock mechanism is provided for restricting rocking of the front axle case that accompanies movement of the center of gravity during work.

A rocking lock mechanism is known in which a cylinder tube of a cylinder capable of allowing and blocking the supply of pressure oil to two oil chambers is used, and in which the rocking lock mechanism is provided so that the longitudinal direction of the cylinder tube coincides with the vertical direction of the machine body (see Patent Document 2).

[Patent Document 1] Japanese Laid-open Patent Application No. 2005-61050

[Patent Document 2] Japanese Unexamined Utility Model Application Publication No. 06-52405

DISCLOSURE OF THE INVENTION

Problems that the Invention is Intended to Solve

However, when the abovementioned rocking lock mechanism is provided in a wheeled work machine, the cylinder is provided to the traveling body in a state in which the longitudinal direction of the cylinder is in the vertical direction, and the elevation of the upper surface of the traveling body is thereby increased. The rotation table is thus disposed in a high position, the center of gravity of the machine body as a whole is raised, and the stability of the machine body is adversely affected.

Therefore, an object of the present invention is to provide a wheeled work machine in which the center of gravity of the machine body is kept low, and the stability of the machine in a working position is maintained without regard to the movement of the center of gravity due to the rotation of the rotation table during work.

Means for Solving the Problems

The technological means described below are employed in the present invention to achieve the aforementioned object.

A first aspect of the present invention, which is designed to solve the above-mentioned problems, is a wheeled work machine comprising a machine frame, an axle case for suspending wheels that is supported by the machine frame so as to be able to rock, and a rocking lock mechanism for restricting rocking of the axle case, wherein an operation body that integrally rocks with the axle case is provided at a center in a left-right direction of the axle case; the rocking lock mechanism has a lock cylinder and a switchover valve for switching both cylinder chambers of the lock cylinder between a communicated state and a closed state; and a piston rod of the lock cylinder extends horizontally and is fixed to the machine frame, and a cylinder tube of the lock cylinder is operably connected to the operation body.

Through this configuration, the rocking of the operating body is restricted by the rocking lock mechanism, and rocking of the axle case is thereby restricted. The traveling body can thereby be prevented from rocking relative to the axle case at such times as during work, for example. The stability of the work position is thereby maintained.

Since the lock cylinder of the rocking lock mechanism is provided to the machine frame so that the longitudinal direction of the lock cylinder is aligned with the horizontal direction, the lock cylinder is not disposed in the rocking direction of the axle case. The lock cylinder can therefore be positioned low in comparison to a case in which the lock cylinder is provided to the upper surface of the traveling body. The rotation table can thus be supported in a low position, and the center of gravity of the machine body as a whole can be positioned low.

A fitted part capable of fitting with a fitting part provided to the operation body is preferably formed in the cylinder tube of the lock cylinder.

According to this configuration, the axle case is pivotably supported by the machine frame so as to be able to rock, and the rocking lock mechanism is connected to the axle case at the same time by fitting the fitted part of the cylinder tube with the fitting part of the operating body. The process for assembling the traveling body can thus be simplified.

Furthermore, an operating means for operating the rocking lock mechanism when the rotation table is rotated to a prescribed angle from a front-rear orientation is preferably provided between the rocking lock mechanism and the rotation table.

A large lateral force or moment acts on the traveling body in conjunction with the rotation of the rotation table during work. Therefore, since the switchover valve is automatically switched from the communicated state to the closed state through an operation in which the front-rear-oriented rotation table is rotated to or beyond a prescribed angle, there is no need for the operator seated in the driver seat to operate a lever, switch, or the like to switch the switchover valve, and ease of operation is enhanced.

The operating means may have an operating arm that is provided to any one of the machine frame and the rotation table, and that operates the rocking lock mechanism by rocking, and may further have an operating cam that is provided to the other of the machine frame and the rotation table, and that rocks the operating arm when the rotation table is rotated a prescribed angle from the front-rear orientation.

According to this configuration, the operating cam is operated by the rotation of the rotation table, and the operating arm operates in conjunction with the operation of the operating cam. Therefore, there is no need to provide a new power source for operating the operating means, and the cost is not increased by providing the operating means.

Through the present invention as described above, the center of gravity of the machine body can be maintained in a low position, and the stability of the work position can be maintained without regard to the movement of the center of gravity caused by rotation of the rotation table during work.

BRIEF DESCRIPTION OF THE DRAWINGS

FIG. 29 is a plan view showing the operation of the detection mechanism and the operating means;

Figure 1:
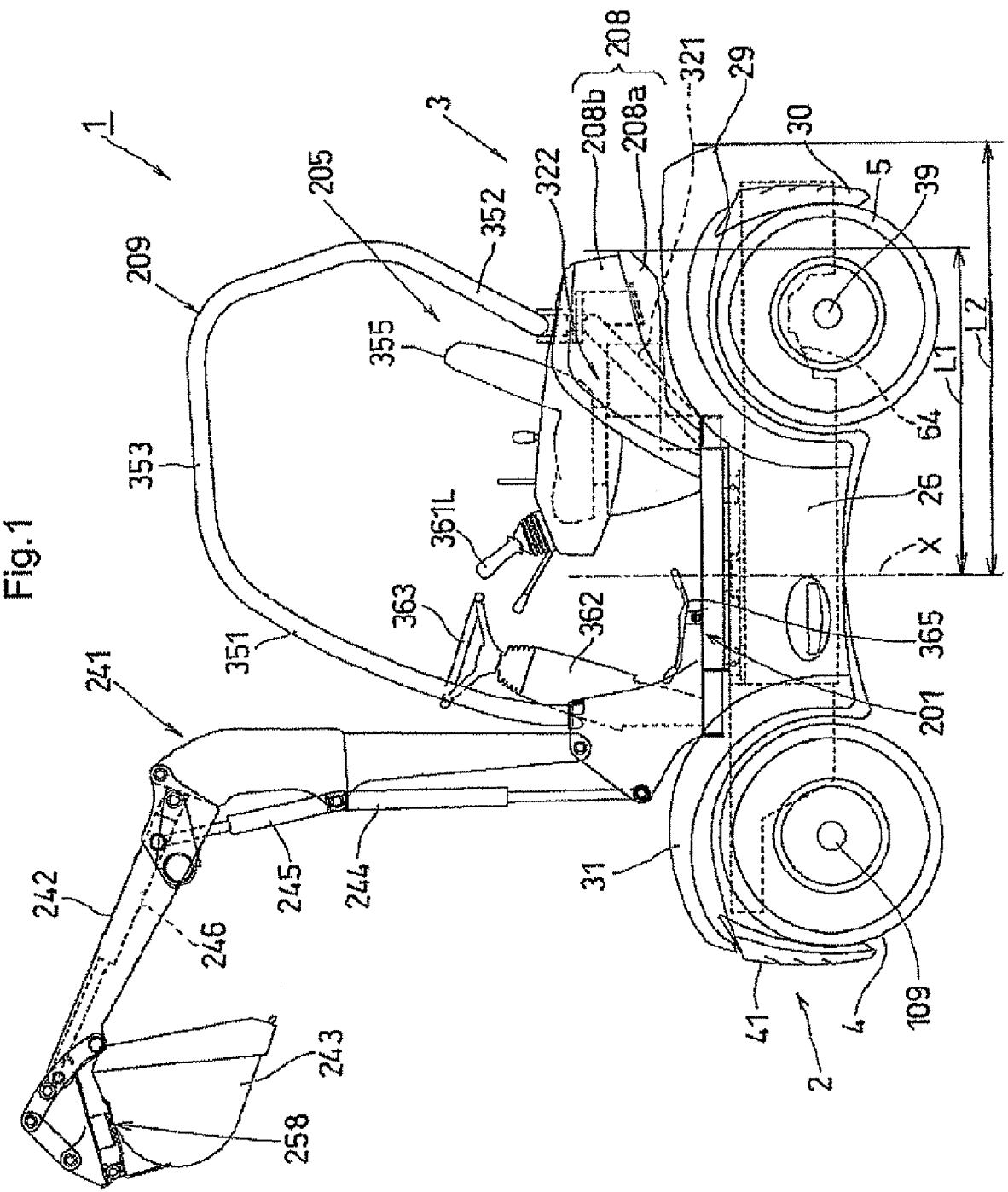
FIG. 1 is a left side view showing the wheeled swiveling work machine.

KEY 2 traveling body
4 front wheels
5 rear wheels
6 machine frame
7 engine
8 traveling system power transmission mechanism
11 engine positioning part
16 rotation bearing
18 upper wall
19 side walls
35 hydrostatic transmission
37 mechanical transmission device
38 rear wheel differential device
39 rear wheel axles
40 final transmission devices
43 casing
58 differential output shafts
61 housing
62 transmission case
63 traveling power transmission system positioning part
64 case fitting parts
67 final transmission cases
70 foot brake means
71 drive-wheel brake means
86 bearing positioning part
91 upper wall
92 side walls
201 rotation table
202 steering device
203 excavating implement
204 driver seat positioning frame
205 driver seat
206 operating devices
X rotation axis

BEST MODE FOR CARRYING OUT THE INVENTION

Embodiments of the present invention will be described hereinafter with reference to the drawings.

In FIGS. 1 through 5, the reference numeral 1 indicates an urban-oriented small-sized wheeled swiveling work machine that is used for gardening or the like, for example. The swiveling work machine 1 is generally composed of a lower traveling body 2 and an upper rotating body 3.

The traveling body 2 is a wheeled traveling body 2 that is enabled to travel by a pairs of left and right front and rear wheels 4, 5, and is provided with the pairs of left and right front and rear wheels 4, 5, a machine frame 6 supported by the front and rear wheels 4, 5, an engine 7 mounted on the machine frame 6, a traveling system power transmission mechanism 8 for transmitting the power from the engine 7 to the rear wheels 5, and a front wheel drive system 33 for branching from the traveling system power transmission mechanism 8 and transmitting power to the front wheels 4.

As shown in FIGS. 1 through 13, the machine frame 6 is primarily composed of a main frame 9 and a front frame 10 that is provided to the front of the main frame 9. The engine 7, a radiator 12, a battery 13, a swivel joint 14, a swiveling motor 15, a rotation bearing 16, and other components are mounted to the main frame 9. A fuel tank 17 for storing fuel for the engine 7 is mounted to the front frame 10, the rear part of the main frame 9 is supported by the left and right rear wheels 5, and the front part of the front frame 10 is supported by the left and right front wheels 4 and made capable of traveling.

The main frame 9 is composed of a sheet material, and is primarily composed of an upper wall 18, left and right side walls 19 that extend downward from the left and right edges of the upper wall 18, a front wall 20 fixed to the front ends of the upper wall 18 and the left and right side walls 19, and a rear wall 21 for connecting the lower rear end parts of the left and right side walls 19 to each other. The main frame 9 is formed in a downward-opening shape.

The engine 7 is longitudinally positioned in the left-right center of the rear part between the left and right side walls 19 of the main frame 9 so that the axis of the crank shaft is in the front-rear direction and an output shaft 23 protrudes to the front. A cut-out opening 24 is formed in the upper wall 18 so that the upper end of the engine 7 protrudes upward from the upper wall 18 of the main frame 9, and a cooling fan 25 is provided to the rear part of the engine 7.

The rear part of the main frame 9 between the left and right side walls 19 is an engine positioning part 11 for positioning the engine 7. The radiator 12 is disposed on the left side of the engine 7 and attached and fixed to the main frame 9, and the battery 13 is disposed on the right side of the engine 7 and attached and fixed to the main frame 9.

The left and right sides of the main frame 9 are covered by side covers 26. The rear part of the main frame 9 is covered by a fixed cover 28 provided with rear-wheel fenders 27 for covering the left and right rear wheels 5 that connects the front parts of the left and right rear-wheel fenders 27 to each other, an opening and closing cover 29 capable of opening and closing that is disposed between the rear parts of the left and right rear wheel fenders 27 that covers the upper side of the rear part of the engine 7, and a rear bumper cover 30 for covering the back surface of the main frame 9.

The space between the rear end of the opening and closing cover 29 and the upper end of the rear bumper cover 30 is open, and through this open portion, the cooling fan 25 discharges the air inside the engine compartment or draws outside air into the engine compartment.

The front frame 10 is covered by a cover member 31 having front-wheel fenders for covering the left and right front wheels 4; and a front bumper cover 41 for covering the front surface of the front frame 10.

The traveling system power transmission mechanism 8 is provided with a traveling drive shaft 34 to which power from the engine 7 is transmitted; a hydrostatic transmission ("HST" hereinafter) 35 to which power is transmitted from the traveling drive shaft 34; a mechanical transmission device 37 for transmitting the power from the HST 35 to a bevel pinion shaft 36; a rear wheel differential device 38 to which power is transmitted from the bevel pinion shaft 36; and left and right final transmission devices 40 for transmitting the power transmitted to the rear wheel differential device 38 to left and right rear wheel axles 39. The traveling drive shaft 34, the HST 35, the mechanical transmission device 37, the bevel pinion shaft 36, and the rear wheel differential device 38 are disposed in front of the engine 7, and the final transmission devices 40 are arranged so as to extend from the sides of the rear wheel differential device 38 to the sides of the front part of the engine 7.

The traveling drive shaft 34 is arranged in the front-rear direction in front of the engine 7, and the rear end thereof is connected to a flywheel 42 that is connected to the output shaft 23 of the engine 7.

Figure 8:
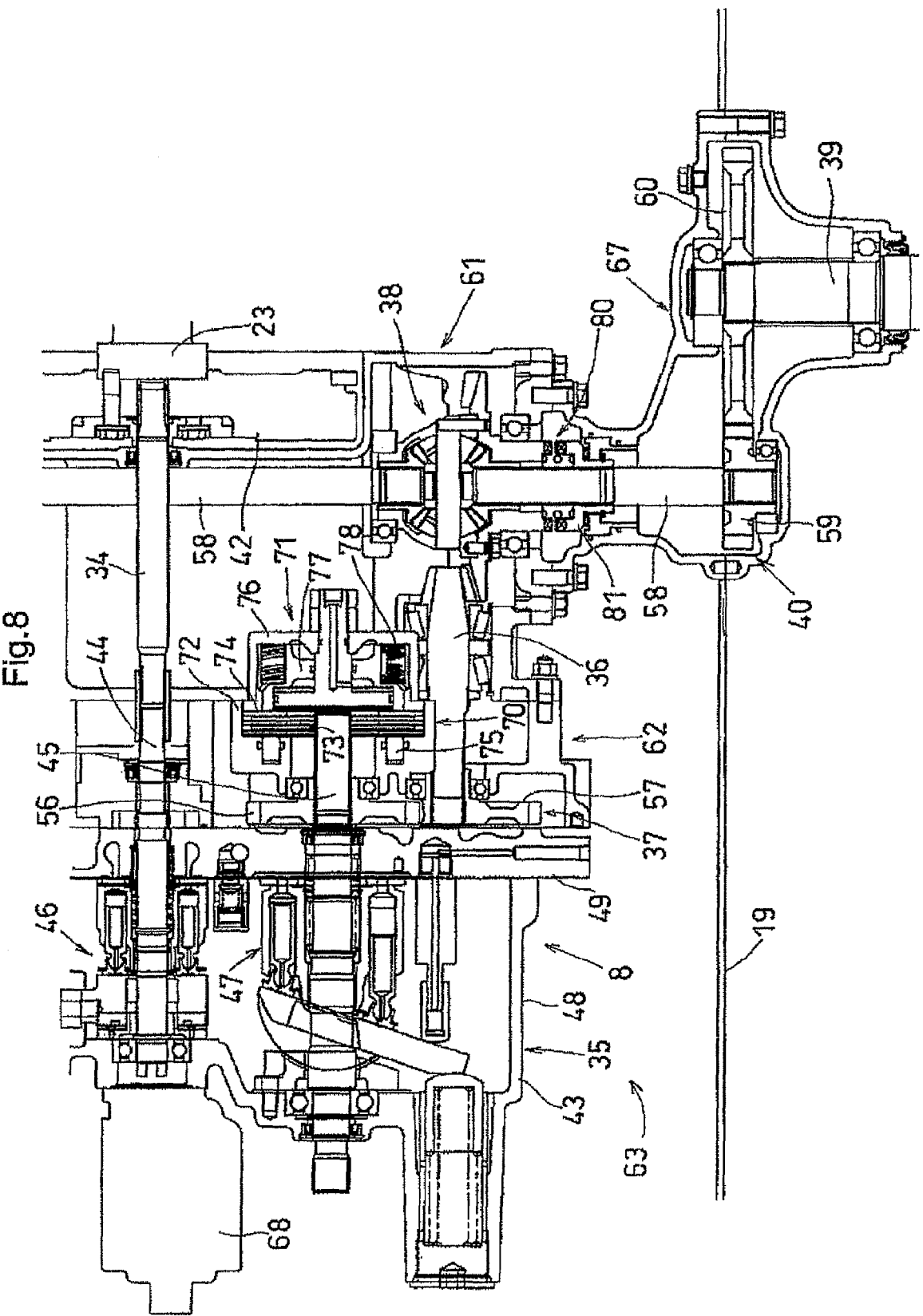
FIG. 8 is a magnified plan view showing the traveling system power transmission mechanism and the surrounding area.
Figure 9:
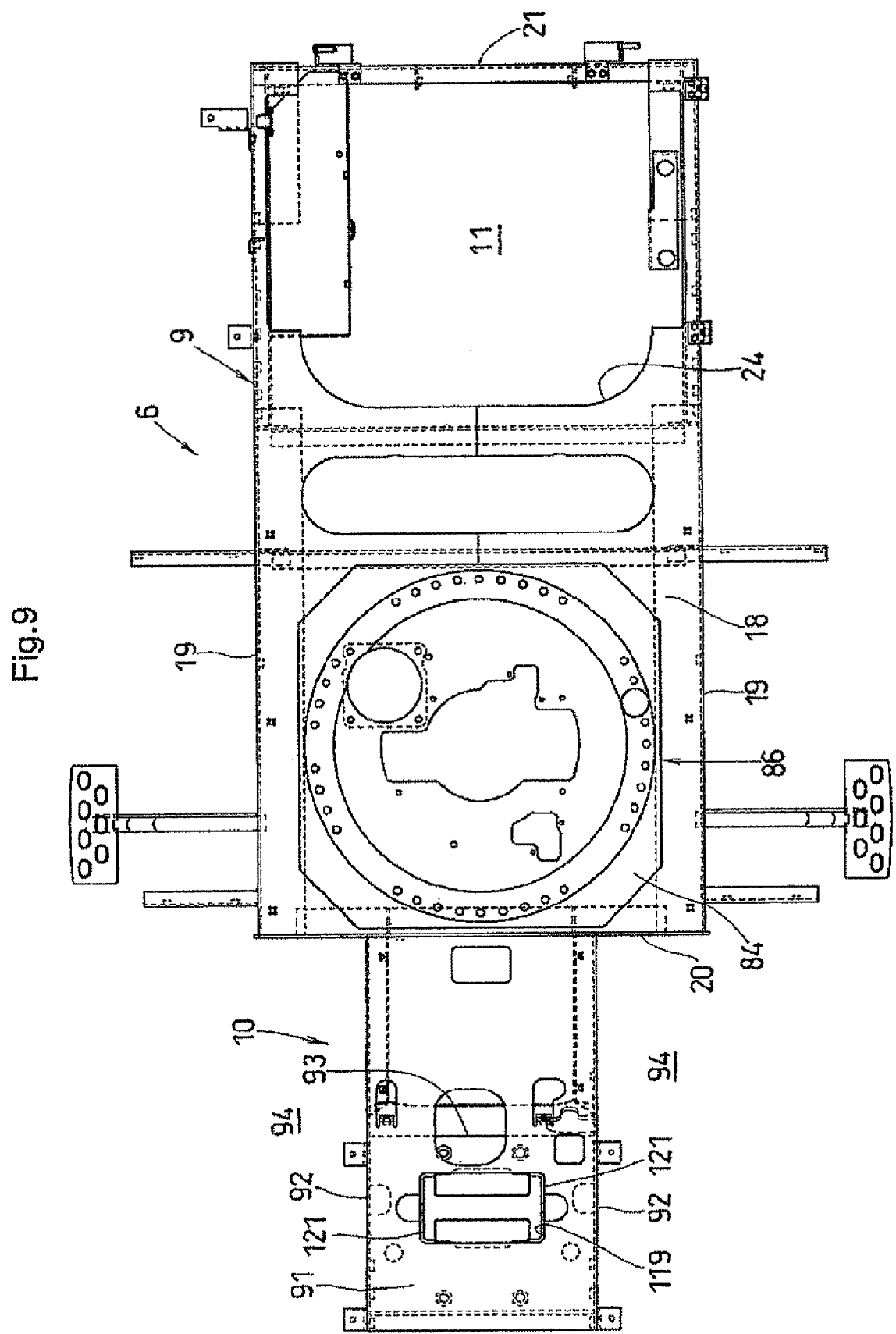
FIG. 9 is a plan view showing the machine frame.
Figure 10:
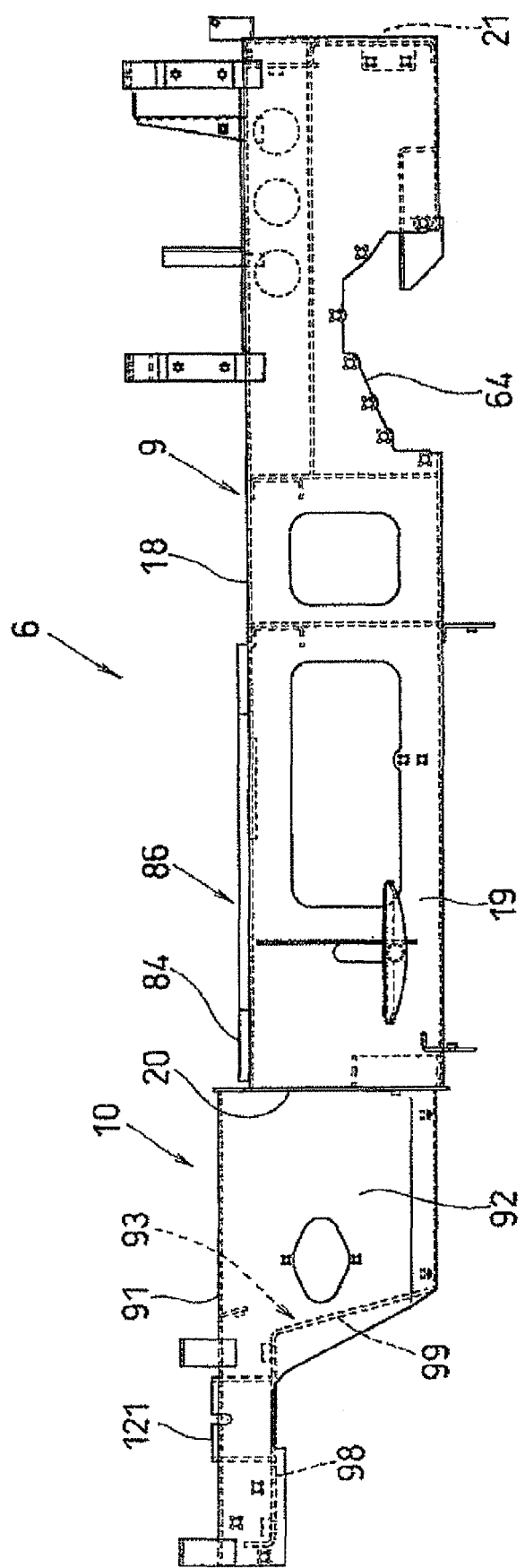
FIG. 10 is a left side view showing the machine frame.
Figure 11:
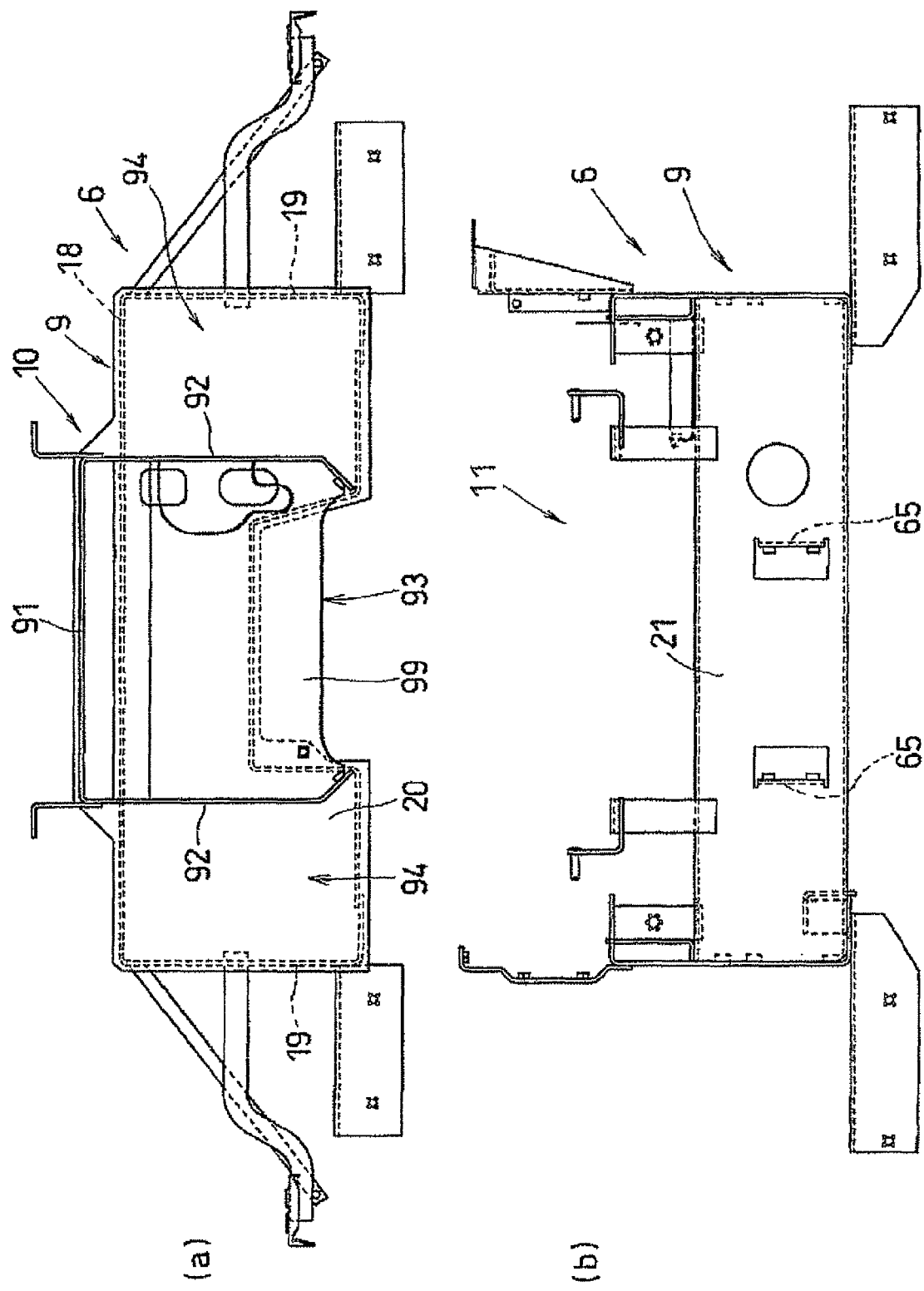
FIG. 11 is a front view showing the machine frame, and a back view showing the machine frame.
Figure 12:
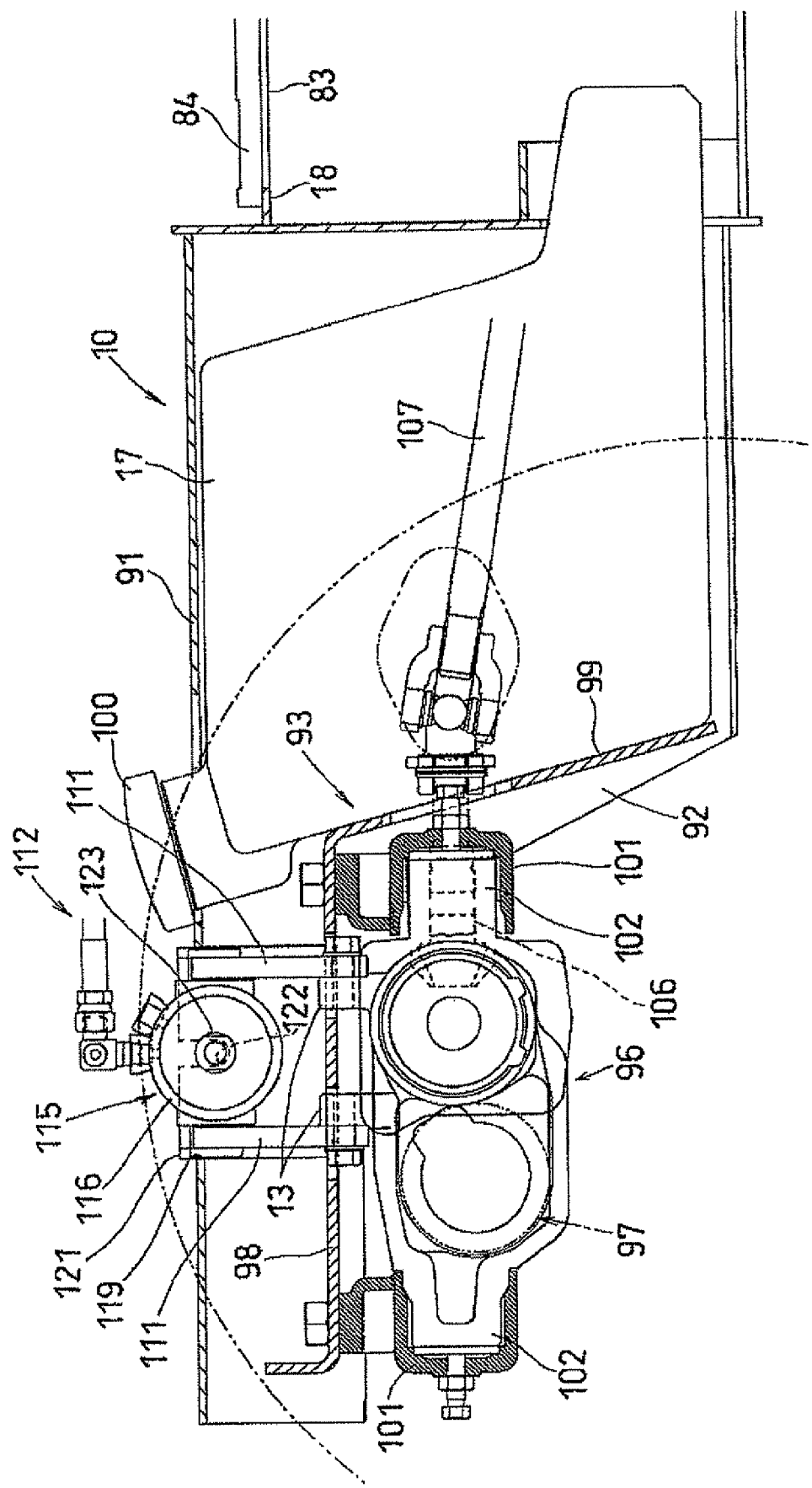
FIG. 12 is a left side view showing the front wheel axle case and the rocking lock mechanism.
Figure 13:
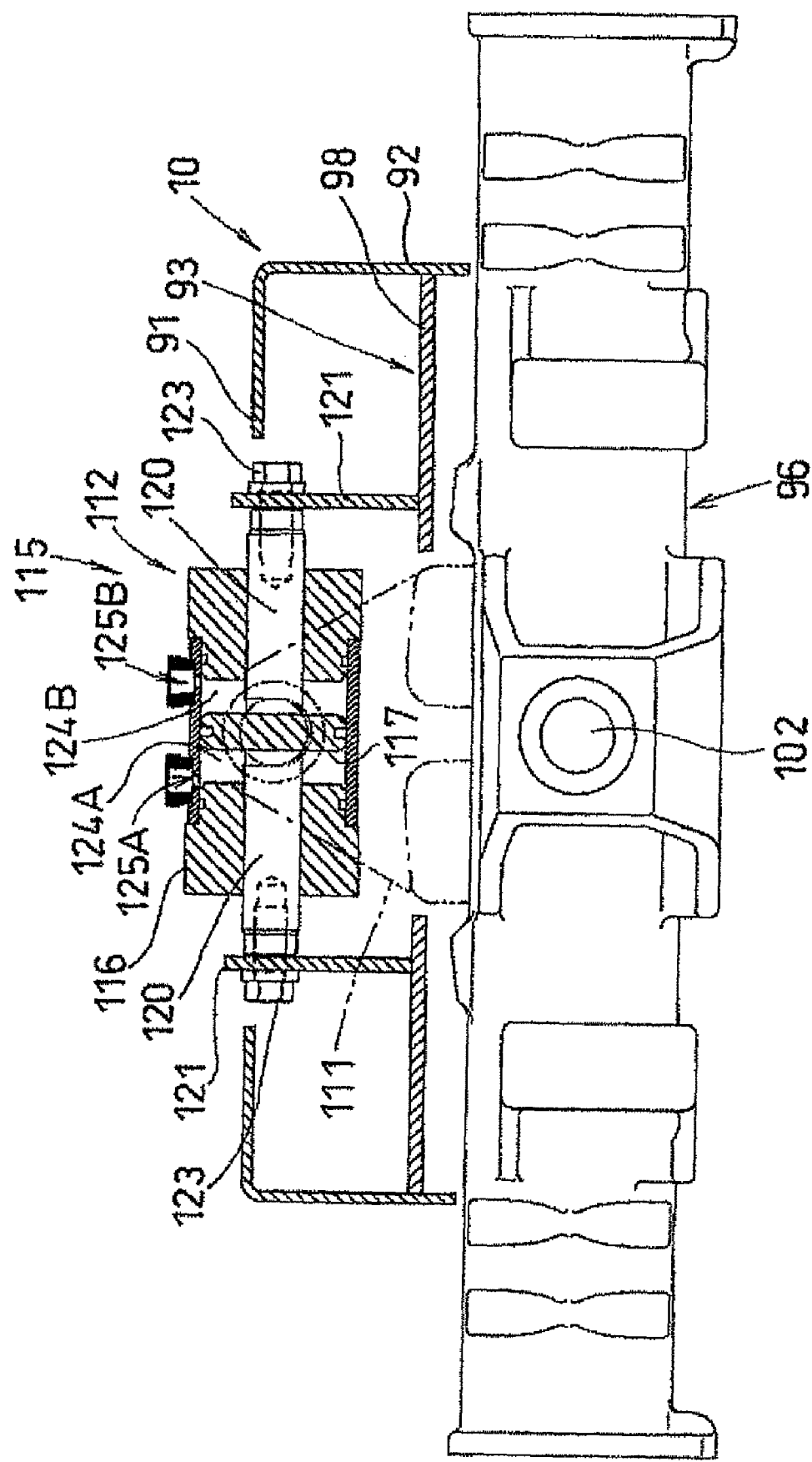
FIG. 13 is a front view showing the front wheel axle case, and a front sectional view showing the swivel locking mechanism.
Figure 14:
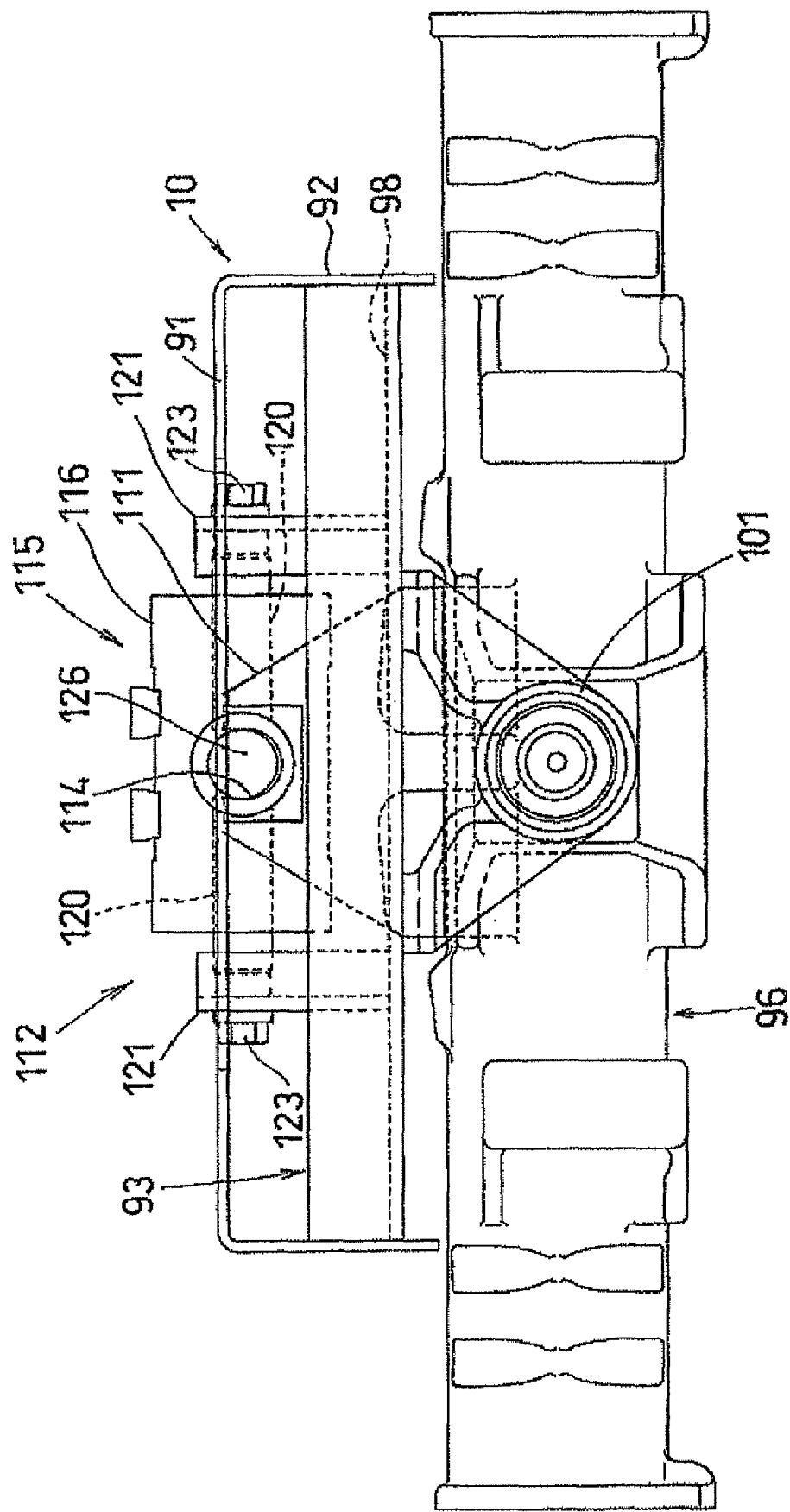
FIG. 14 is a front view showing the front wheel axle case and the swivel locking mechanism.
Figure 15:
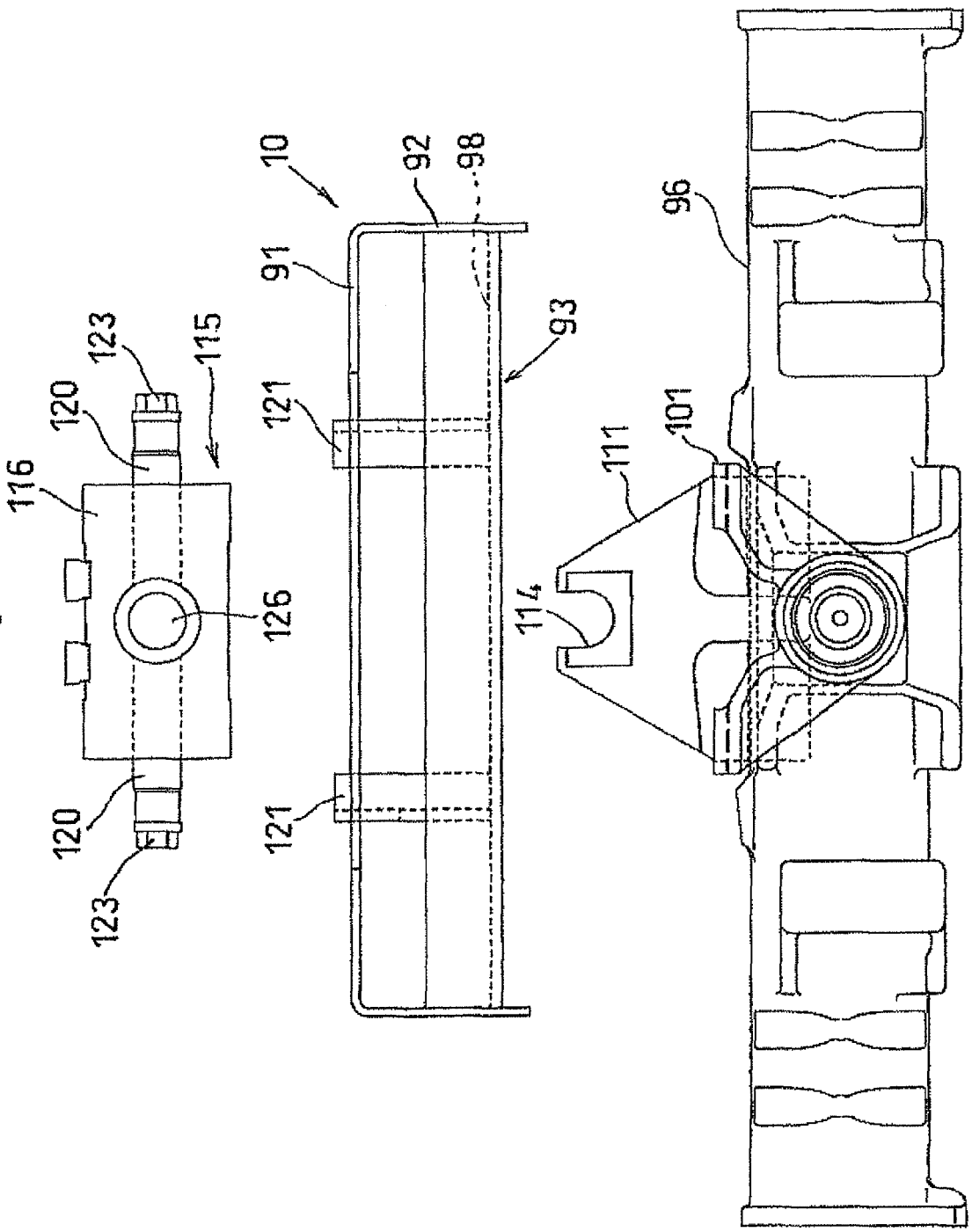
FIG. 15 is an exploded front view showing the front wheel axle case and the swivel locking mechanism.
Figure 16:
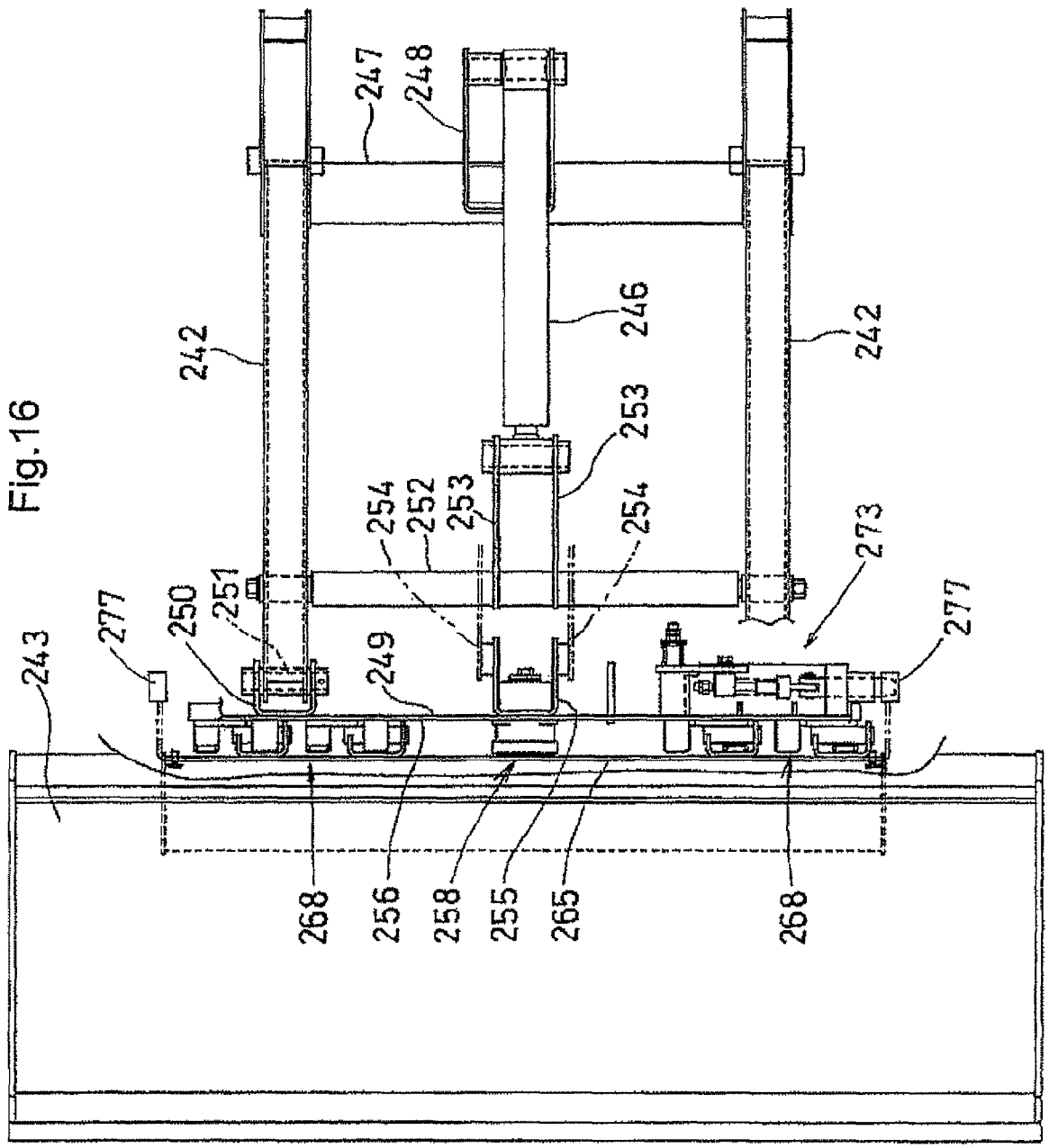
FIG. 16 is a plan view showing the excavating implement.
Figure 17:
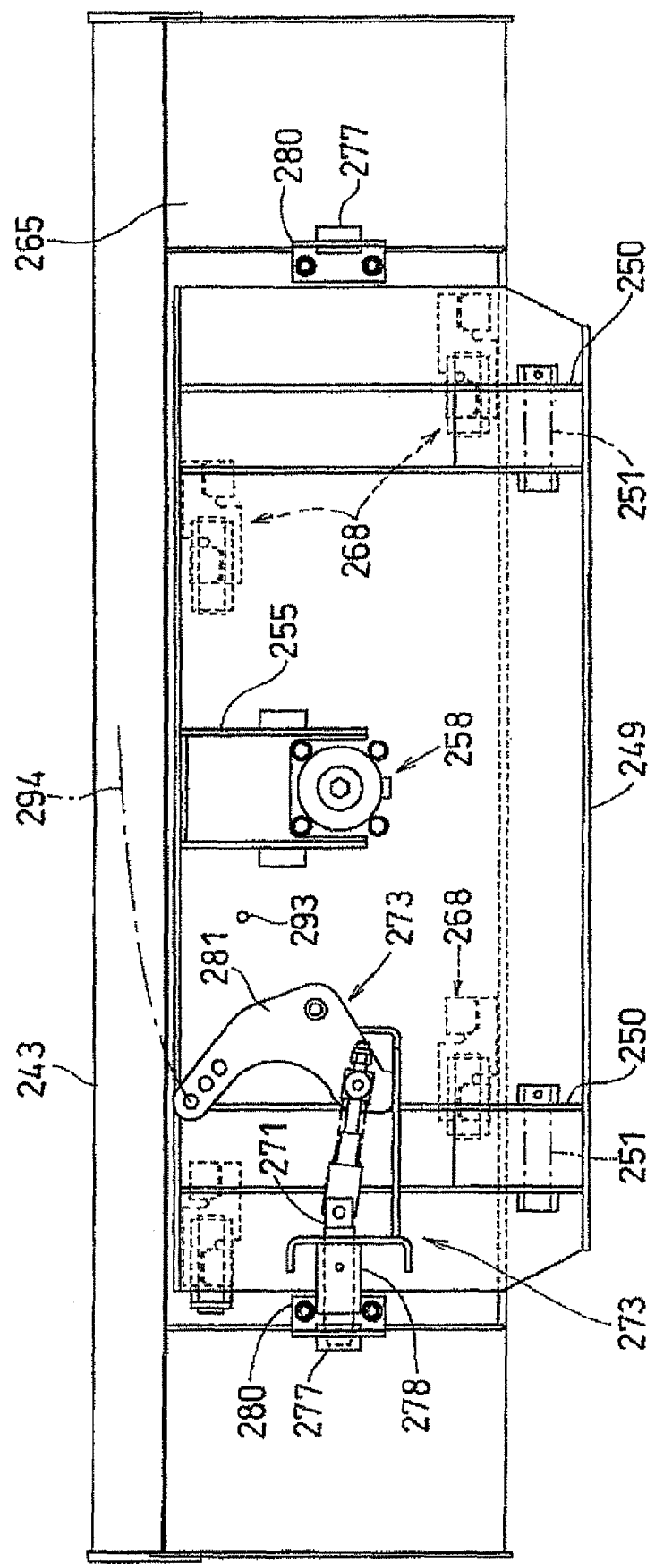
FIG. 17 is a back view showing the bucket.
Figure 18:
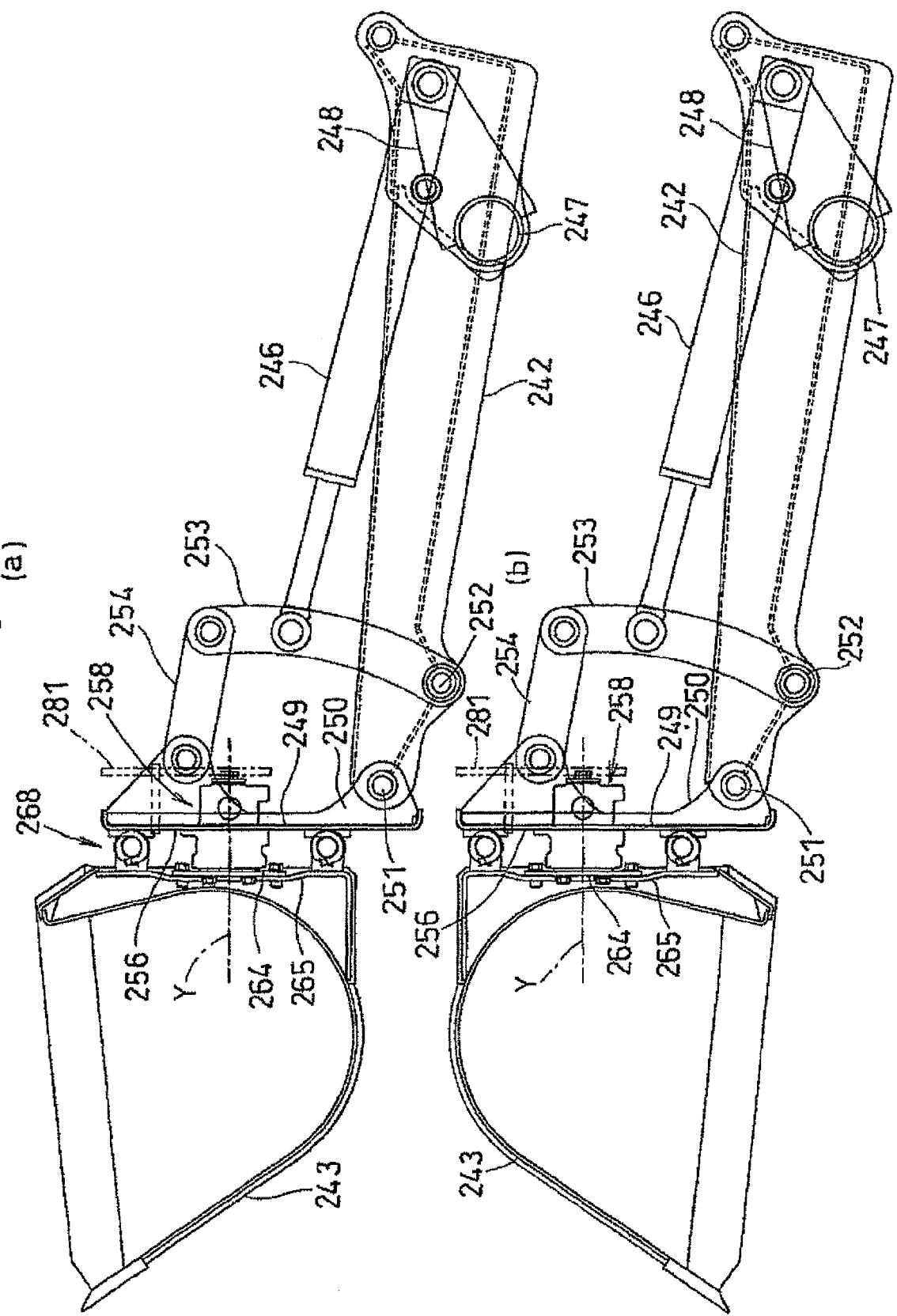
FIG. 18 is a left side view showing the bucket and arms.
Figure 19:
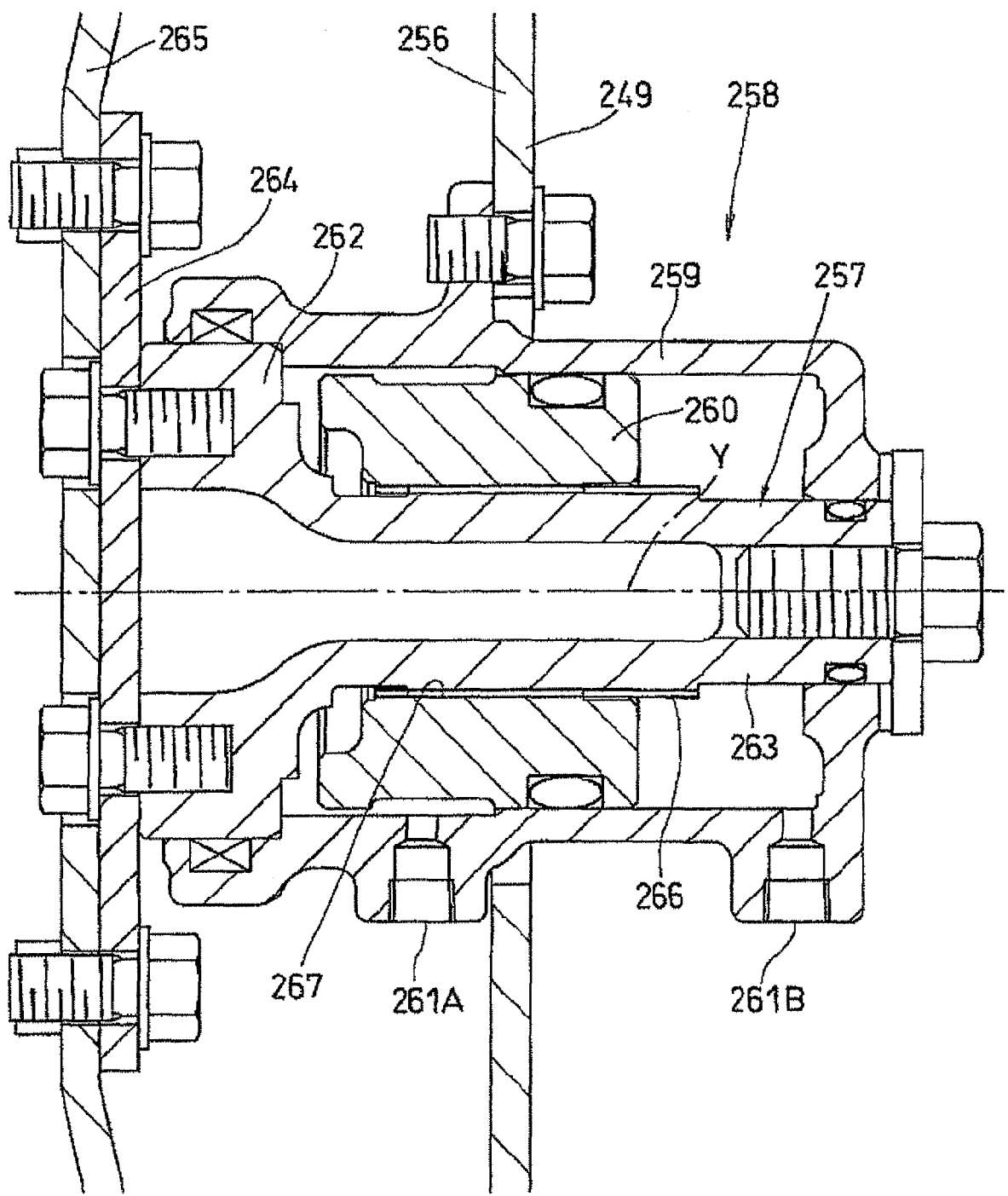
FIG. 19 is a sectional view showing the rotation means.
Figure 20:
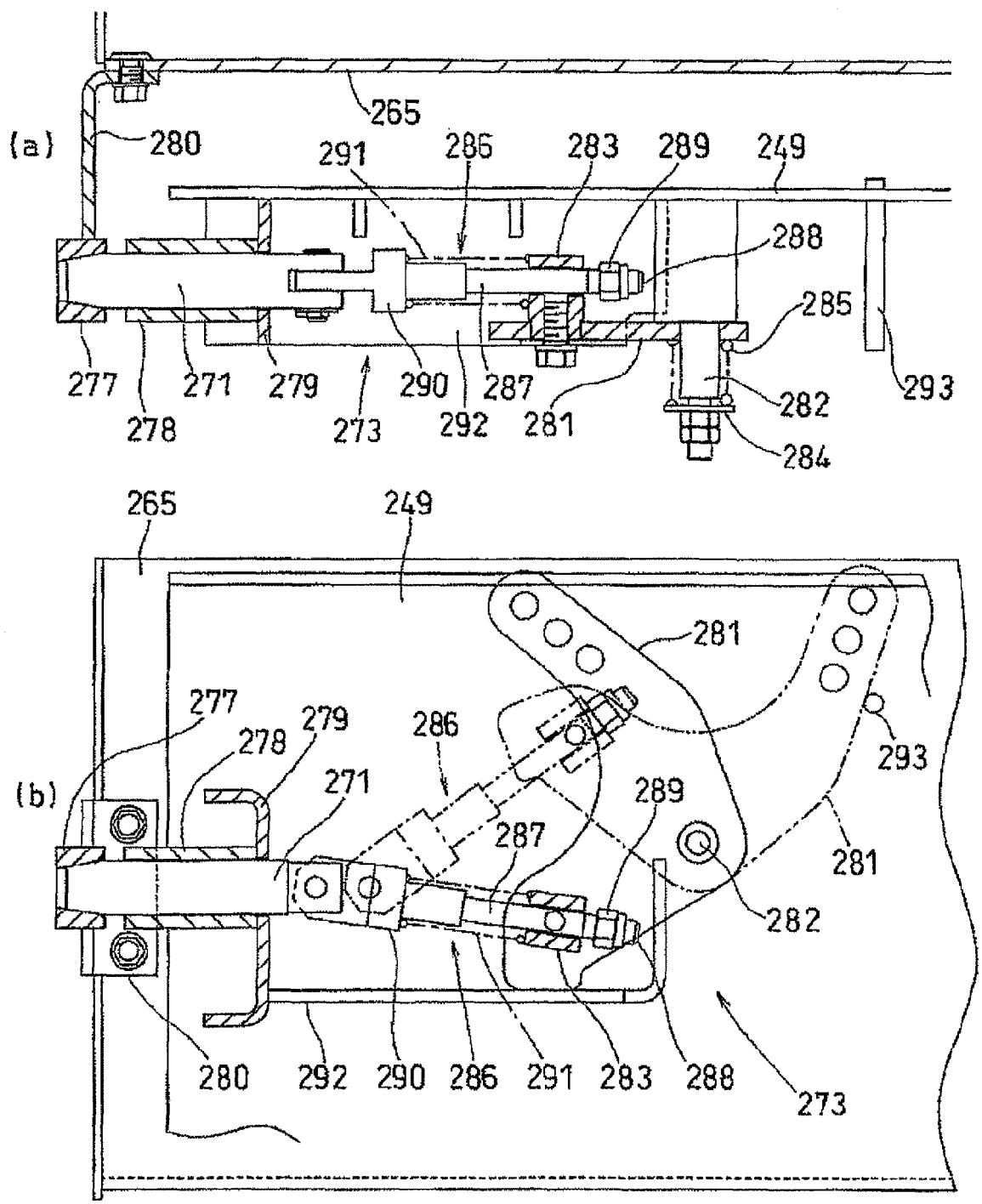
FIG. 20 is a plan view showing the orientation maintaining means, and a back view showing the orientation maintaining means.
Figure 21:
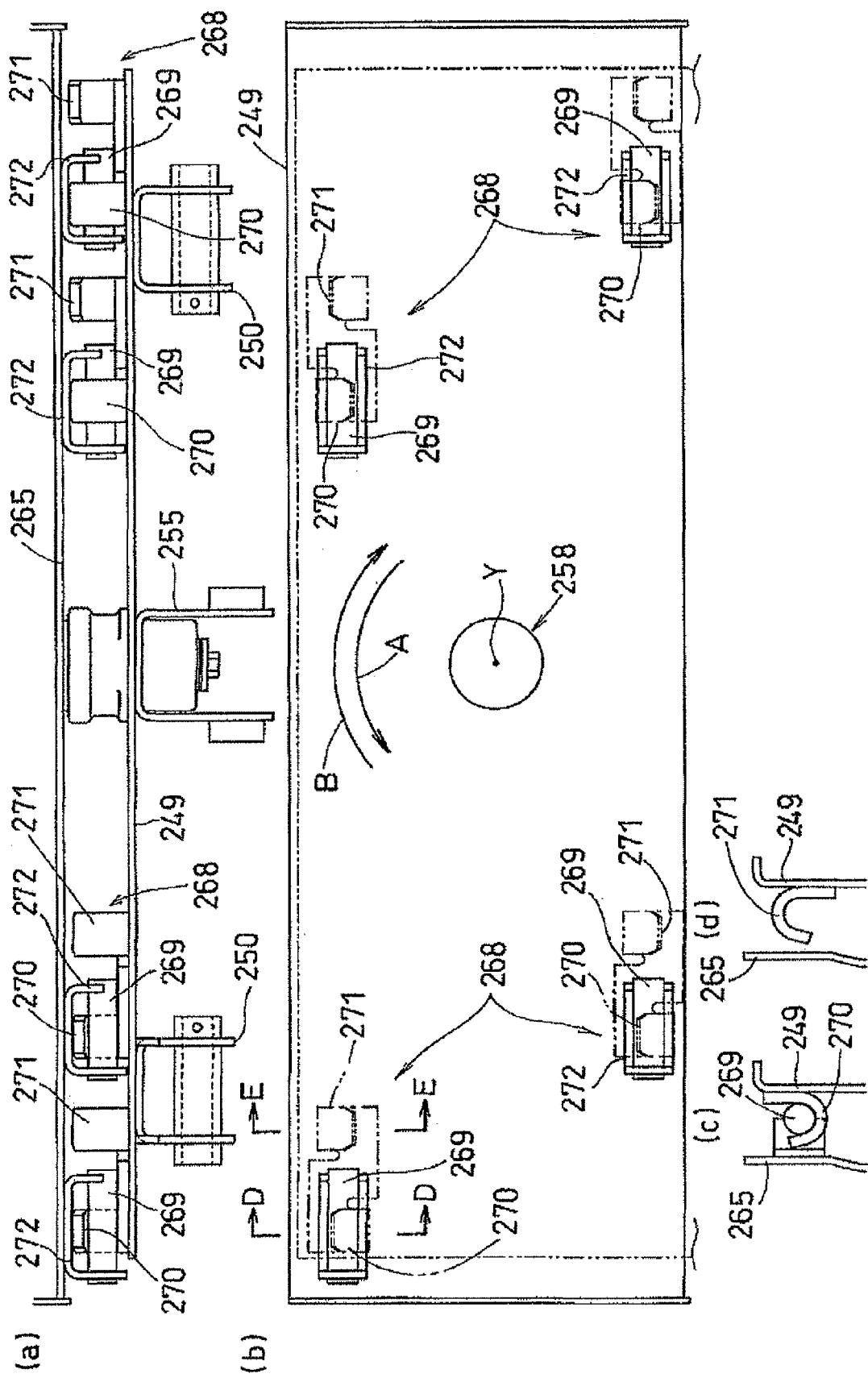
FIG. 21 is a plan view, a back view, and a sectional view showing the rotation restriction means.
Figure 30:
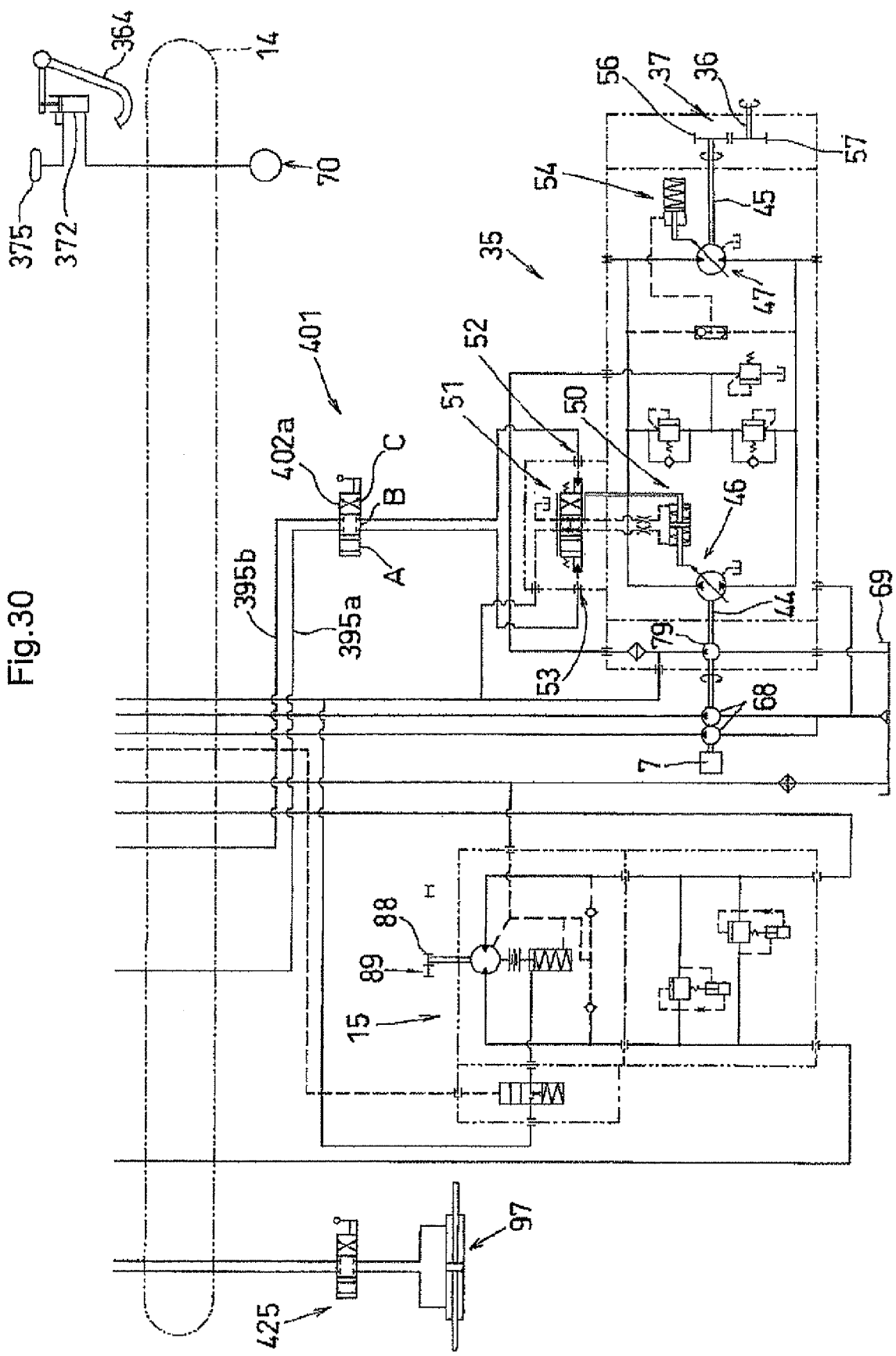
FIG. 30 shows the hydraulic circuit on the side of the traveling body.

In the HST 35 as shown in FIGS. 8 and 30, an input shaft 44 for inputting the power from the engine 7, and an output shaft 45 for outputting power to the rear wheel differential device 38 are provided in parallel fashion on the left and right inside a casing 43, and the casing 43 accommodates a hydraulic pump 46 provided to the input shaft 44, and a hydraulic motor 47 provided to the output shaft 45. The HST 35 is a transmission in which the hydraulic motor 47 is driven by pressure oil that is sent from the hydraulic pump 46 driven by the input shaft 44, and power is outputted from the output shaft 45 driven by the hydraulic motor 47.

The casing 43 is composed of a main body 48 in which the rear side is open, and a cover 49 for covering the opening on the rear side of the main body 48, and the input shaft 44 and the output shaft 45 protrude to the rear from the cover 49.

The input shaft 44 of the HST 35 is disposed coaxially with the traveling drive shaft 34 and in front of the traveling drive shaft 34, and is coupled and connected to the traveling drive shaft 34 by a coupling.

The hydraulic pump 46 is composed of a variable displacement pump in which the angle of a swash plate can be varied by a swash plate control actuator 50, and by varying the angle of the swash plate, the flow of pressure oil discharged to the hydraulic motor 47 is varied, and the rotational speed (wheel speed) of the output shaft 45 can be varied. The hydraulic pump 46 can change the direction of the flow of pressure oil discharged to the hydraulic motor 47 and switch the rotation direction of the output shaft 45 to positive rotation (forward rotation) or negative rotation (reverse rotation).

The swash plate control actuator 50 is controlled by a forward-reverse switching means 51 that is composed of a pilot operation switching servo valve operated by a pilot pressure. When the pilot pressure rises in a forward travel port 52 of the forward-reverse switching means 51, the swash plate of the hydraulic pump 46 is controlled so that the output shaft 45 rotates positively. When the pilot pressure rises in a reverse travel port 53, the swash plate of the hydraulic pump 46 is controlled so that the output shaft 45 rotates negatively. The flow rate of pressure oil discharged from the hydraulic pump 46 is controlled by the amount of pressure that occurs in the forward travel port 52 or the reverse travel port 53, and the rotational speed of the output shaft 45 is controlled.

The hydraulic motor 47 is composed of a variable displacement pump, the angle of the swash plate can be changed between two levels by a high-low switching actuator 54, and the rotational power outputted from the output shaft 45 can be switched between a high speed and a low speed by varying the swash plate angle.

The bevel pinion shaft 36 is arranged in parallel fashion below and to the left of the portion of the output shaft 45 of the HST 35 that protrudes to the rear from the cover 49. The bevel pinion shaft 36 extends further to the rear than the rear end of the output shaft 45 of the HST 35, and a bevel gear part is formed on the rear end of the bevel pinion shaft 36.

The mechanical transmission device 37 in the present embodiment is a speed reduction mechanism composed of a gear transmission mechanism composed of a drive-side gear 56 fitted so as to be able to integrally rotate with the portion of the output shaft 45 of the HST 35 that protrudes to the rear from the cover 49, and a driven-side gear 57 that meshes with the drive-side gear 56 and is fitted so as to be able to integrally rotate with the front end of the bevel pinion shaft 36.

The mechanical transmission device 37 may be an acceleration mechanism (speed change mechanism) or a same-speed mechanism, and may be a transmission that performs coupling and other power transmission.

The rear wheel differential device 38 is disposed behind the bevel pinion shaft 36 and in front of the left side of the engine 7, and differential output shafts 58 protrude to the left and right.

The rear wheel axles 39 are provided to the rear of the differential output shafts 58 of the rear wheel differential device 38 so as to overlap the engine 7 as viewed from the side, and the rear wheels 5 are attached and fixed to the outer ends of the left and right rear wheel axles 39.

The final transmission devices 40 are speed reduction mechanisms composed of gear transmission mechanisms that have drive-side gears 59 fitted so as to be able to integrally rotate with the outer ends in the left-right direction of the differential output shafts 58, and driven-side gears 60 that are fitted so as to be able to integrally rotate with the rear wheel axles 39.

The final transmission devices 40 may also be acceleration mechanisms (speed change mechanisms) or same-speed mechanisms.

In the traveling system power transmission mechanism 8 configured as described above, the power outputted to the front from the engine 7 is redirected by the HST 35 and transmitted to the rear, the power is transmitted to the left and right sides by the rear wheel differential device 38 in front of the engine 7 and transmitted to the rear by the final transmission devices 40 so as to reach the rear wheel axles 39, and the traveling system power transmission mechanism 8 is thus made compact in the front-rear direction.

A housing 61 for accommodating the flywheel 42, the rear wheel differential device 38, and other components is connected and fixed to the front side of the engine 7. A transmission case 62 for accommodating the mechanical transmission device 37 and other components is connected and fixed to the front side of the housing 61. The housing 43 (cover 49) of the HST 35 is connected and fixed to the front side of the transmission case 62. The rear wheel differential device 38, the mechanical transmission device 37, the HST 35, and other components are thus attached to, and integrated with, the engine 7; the housing 61, the transmission case 62, and the housing 43 are positioned between the left and right side walls 19 of the main frame 9; and the forward side of the engine positioning part 11 between the left and right side walls 19 of the main frame 9 forms a traveling power transmission system positioning part 63.

Final transmission cases 67 for accommodating the final transmission devices 40 are fixed to the left and right sides of the housing 61. The rear wheel axles 39 are supported by the final transmission cases 67, and the final transmission cases 67 are attached and fixed to the main frame 9.

The inside ends in the left-right direction of the front parts of the left and right final transmission cases 67 are bolted to the sides of the housing 61, and the rear sides of the left and right final transmission cases 67 are bolted to the upper sides of the side walls 19 of the main frame 9.

Case fitting parts 64 composed of cut-out parts that open downward so as to fit onto the upper parts of the final transmission cases 67 from above are formed in the lower rear parts of the left and right side walls 19 of the main frame 9. The final transmission cases 67 are bolted to the main frame side walls 19 around the case fitting parts 64.

The front part of the engine 7 is supported by the main frame 9 via the housing 61 and the final transmission cases 67. The rear part of the engine 7 is supported by tabbed parts 65 formed in the rear wall 21 of the main frame 9, and connecting plates 66 for connecting the lower side surfaces of the engine 7.

In the configuration described above, since the housing 61, the transmission case 62, the housing 43 of the HST 35, and the final transmission cases 67 are attached to, and integrated (unitized) with, the engine 7 (since the rear wheel differential device 38, the mechanical transmission device 37, the HST 35, the final transmission devices 40, and the rear wheel axles 39 are attached to, and integrated with, the engine 7. As a result, after these components are assembled, the machine frame 6 can be assembled with the assembly from above the engine 7 and other components, and assembly with respect to the machine frame 6 is facilitated.

A configuration may be adopted in which the housing 61, the transmission case 62, the HST 35, and the final speed change cases are combined, after which the machine frame 6 is assembled with the assembly from above, the engine 7 is then inserted between the left and right side walls 19 from the top side of the upper wall 18 of the main frame 9, and the engine 7 is then attached and fixed to the housing 61 and the rear wall 21 of the main frame 9.

In this case, the cut-out opening 24 formed in the upper wall 18 of the main frame 9 is formed so as to be large enough to allow the engine 7 to be inserted between the left and right side walls 19 from above.

The rear wheel differential device 38 is provided in front of the engine 7, and the rear wheel axles 39 for receiving the power from the rear wheel differential device 38 and rotating the rear wheels 5 are provided to the rear of the differential output shafts 58 so as to overlap the engine 7 as viewed from the side, whereby the swiveling work machine 1 can be made compact in the front-rear direction.

In other words, by providing the rear wheel differential device 38 in front of the engine 7, the engine 7 can be separated to the rear from the swivel axis X (center of the rotation bearing 16) of the rotating body 3, and a wide space can be obtained in the step 215 described hereinafter.

The engine 7 is positioned behind the rear wheel axles 39 when the rear wheel axles 39 are provided in the same axis as the differential output shafts 58 of the rear wheel differential device 38, and when work is performed with the rotating body 3 facing the rear, the distance from the rear wheel axles 39 to the work position behind the engine 7 increases, and work properties are poor in comparison to the present embodiment. Therefore, the work properties when the rotating body 3 is facing the rear are improved by providing the rear wheel axles 39 to the rear of the differential output shafts 58 so as to overlap the engine 7 as viewed from the side according to the present embodiment.

In the positioning of the rear wheel differential device 38 in front of the engine 7, the rear wheel differential device 38 is positioned away from the flywheel 42 in the left and right directions, and the rear wheel differential device 38 can therefore be positioned as close as possible to the engine 7. The distance between the differential output shafts 58 and the rear wheel axles 39 is thereby reduced, and the final transmission devices 40 and final transmission cases 67 can be made compact.

The left-right width of the swiveling work machine increases when the left and right side frame parts of the machine frame are composed of angled pipe, and although the final transmission cases 67 are attached and fixed to the outer sides of the angled pipe in the left-right direction, and the left-right width of the swiveling work machine does not increase when the final transmission cases 67 are attached and fixed to the lower surfaces of the angled pipe, the height of the traveling body 2 increases.

In contrast, in the present embodiment, the main frame 9 of the machine frame 6 is provided with the upper wall 18 and the left and right side walls 19 formed by sheet materials, the engine 7 is positioned between the left and right side walls 19, and the final transmission cases 67 are attached and fixed to the left and right side walls 19. Therefore, the swiveling work machine 1 can be made compact in the left-right direction, or the vertical dimensions can be reduced, and the rotating body 3 on top can be positioned low.

A main pump 68 composed of a double-barreled gear pump coupled and connected to the front end of the input shaft 44 and driven by the input shaft 44 of the HST 35 is attached to the front side of the HST 35, and operating oil is fed from the main pump 68 to various types of actuators provided to the swiveling work machine 1.

In the present embodiment, an oil pan 69 provided to the bottom end of the engine 7 is used as an operating oil tank for storing operating oil for hydraulic devices.

The traveling system power transmission mechanism 8 is provided with a foot brake means 70 (travel brake) for restricting the travel power transmitted from the HST 35 to the rear wheel differential device 38, and a drive-wheel brake means 71 for maintaining the power transmission system between the HST 35 and the rear wheel differential device 38 in a stopped state. The brake means 70, 71 are disposed behind the drive-side gear 56 of the mechanical transmission device 37.

The foot brake means 70 is accommodated in the transmission case 62, and has a brake case 72 fixed to the transmission case 62, a brake disk 73 fitted onto the rear end of the output shaft 45 of the HST 35 so as to be able to integrally rotate, a plate 74 provided to the brake case 72, and a piston 75 for pressing the brake disk 73 and the plate 74 together. The pressure oil inside a master cylinder 372 presses on the piston 75 through the pressing operation of a brake pedal 364 provided to the rotating body 3, whereby the piston 75 moves, and the brake disk 73 and plate 74 are pressed together, and the output shaft 45 of the HST 35 is thereby restricted.

The drive-wheel brake means 71 is disposed behind the foot brake means 70, and has a drive-wheel brake case 76 accommodated in the housing 61 and fixed to the housing 61, and a piston 77 accommodated in the drive-wheel brake case 76.

The brake case 72 is open to the rear, the drive-wheel brake case 76 is open to the front, and the brake case 72 and drive-wheel brake case 76 are communicated with each other.

A spring 78 for pushing on the piston 77 and pushing the brake disk 73 and plate 74 together when the engine 7 is stopped is accommodated in the drive-wheel brake case 76. Through the starting of the engine 7, the pressure oil from a charge pump 79 (see FIG. 30) driven by the engine 7 acts on the piston 77 and moves the piston 77 against the urging force of the spring 78, and the pressing together of the brake disk 73 and the plate 74 is released.

A differential locking device 80 is provided to the left of the rear wheel differential device 38. As shown in FIG. 8, the differential locking device 80 is a hydraulic differential locking device 80 in which a differential lock cylinder 81 that rotates integrally with the left-side differential output shaft 58 is moved by oil pressure toward the rear wheel differential device 38 against a return spring, and locking teeth formed in the differential lock cylinder 81 mesh with locking teeth provided to the rear wheel differential device 38, whereby differential action of the rear wheel differential device 38 is prevented, and differential locking occurs.

An open part 83 is formed in the upper surface of the upper wall 18 at the front of the main frame 9, and a bearing attachment plate 84 composed of a thick plate material is fixed to the upper surface of the upper wall 18 so as to block the open part 83.

The rotation bearing 16 is disposed on the bearing attachment plate 84, and the outer race 85 of the rotation bearing 16 is bolted and attached to the bearing attachment plate 84.

The rotation bearing 16 is disposed in the substantial center between the front and rear wheels 4, 5, the axis of the rotation bearing 16 is designated as the swivel axis X, and the upper surface of the bearing attachment plate 84 on the upper surface of the upper wall 18 at the front of the main frame 9 is designated as a bearing positioning part 86.

An internal gear 89 is formed in the internal peripheral side of the inner race 87 of the rotation bearing 16, and a pinion 88 meshes with the internal gear 89. The pinion 88 is fixed to the output shaft of a swivel motor 15 that is composed of a hydraulic motor fixed to the main frame 9, and the inner race 87 of the rotation bearing 16 can be rotationally driven about the swivel axis X by the swivel motor 15.

A swivel joint 14 is disposed in the same axis as the swivel axis X at the front part between the left and right side walls 19 of the main frame 9, and pressure oil is circulated to the traveling body 2 or the rotating body 3 via the swivel joint 14.

As shown in FIGS. 9 through 15, the front frame 10 of the machine frame 6 is composed of a plate material. In other words, the front frame 10 is primarily composed of an upper wall 91, left and right side walls 92 that extend downward from the left and right edges of the upper wall 91, and a connecting plate 93 for connecting the front parts of the left and right side walls 92 to each other, and the front frame 10 is formed so that the rear part thereof opens downward.

The upper wall of the machine frame 6 is formed by the upper wall 18 of the main frame 9 and the upper wall 91 of the front frame 10, and the upper wall of the machine frame 6 is formed by the left and right side walls 19 of the main frame 9 and the left and right side walls 92 of the front frame 10.

The front frame 10 is formed so that the left-right width thereof is less than that of the main frame 9, and front-wheel positioning spaces 94 for positioning the front wheels 4 are formed in front of the main frame 9 on the left and right sides of the front frame 10.

The dimension to which the left and right side walls 92 extend downward from the upper wall 91 is less on the front side than on the rear side, the left and right side walls 92 are formed so that the vertical width on the front sides thereof is less than on the rear sides thereof, and a positioning space for a steering cylinder 97 composed of a front-wheel axle case 96 and a hydraulic cylinder, and other components is formed below the front part of the front frame 10.

The connecting plate 93 is provided with a horizontally oriented horizontal wall part 98 for connecting the lower ends of the front parts of the left and right side walls 92 to each other, and a tilted wall part 99 that extends in a tilted direction that moves downward towards the rear from the rear end of the horizontal wall part 98 and connects the middle parts in the front-rear direction of the left and right side walls 92 to each other.

A fuel tank 17 for storing the fuel for the engine 7 is provided to the rear part between the left and right side walls 92 of the front frame 10.

The fuel tank 17 is inserted between the left and right side walls 92 from below and attached and fixed to the front frame 10. The front surface of the fuel tank 17 is positioned in contact with the tilted wall part 99 of the connecting plate 93, and the lower rear end of the fuel tank 17 protrudes toward the main frame 9 via a cut-out part formed at the lower end of the front wall of the main frame 9.

A passage hole that passes through a fill opening 100 of the fuel tank 17 is formed in the upper wall 91 of the front frame 10, and the lower surface of the fuel tank 17 is covered by a cover (not shown) mounted to the lower surface of the front frame 10 after the fuel tank 17 is mounted.

The front-wheel axle case 96 for steerably linking the left and right front wheels 4 is disposed in a left-right orientation on the lower surface of the horizontal wall part 98 of the connecting plate 93 of the front frame 10. Front wheel bearings 101 attached and fixed to the lower surface of the horizontal wall part 98 of the connecting plate 93 are provided on the front and rear sides of the left-right center part of the front-wheel axle case 96, and the front-wheel axle case 96 is supported by the front and rear front wheel bearings 101 via center pins 102 so as to be able to pivot about a front-rear-directed axis.

Gear cases 103 are provided on the left and right sides of the front-wheel axle case 96, and the front wheels 4 are supported by the left and right gear cases 103 so as to be able to steer.

The steering cylinder 97 for steering the front wheels 4 is positioned in the left-right direction in front of the front-wheel axle case 96 and attached and fixed to the front-wheel axle case 96. The steering cylinder 97 is provided with piston rods that protrude from the left and right sides of a cylinder tube, the left and right piston rods are coupled and connected to the front wheels 4 on the same side in the left-right direction, and the steering cylinder 97 is controlled by a power steering controller 367 provided to the rotating body 3.

Since the front wheels 4 are the steered wheels, a large space is required to accommodate the front wheels 4, and the left-right width of the swiveling work machine 1 is large when the front frame 10 is formed so as to have the same width as the main frame 9 in the left-right direction. However, in the present embodiment, the left-right width of the front frame 10 is less than that of the main frame 9, and the front-wheel positioning spaces 94 are formed for positioning the front wheels 4 in front of the main frame 9 and on the left and right sides of the front frame 10, and the left-right width of the swiveling work machine 1 can therefore be prevented from increasing.

The front wheel drive system 33 for transmitting power to the front wheels 4 is provided with a front wheel power takeoff shaft 104 that protrudes forward from the transmission case 62 and is connected to the driven-side gear 57 of the mechanical transmission device 37; a front wheel differential device 105 provided in the front-wheel axle case 96; a bevel pinion shaft 106 for inputting power to the front wheel differential device 105; a transmission shaft 107 for coupling and connecting the bevel pinion shaft 106 and the front wheel power takeoff shaft 104 to each other; and a final speed reduction mechanism (transmission mechanism) (not shown) for transmitting power from the differential output shaft 108 of the front wheel differential device 105 to a front wheel drive shaft 109 for driving the front wheels 4.

Actuation bodies 111 that pivot integrally with the front-wheel axle case 96 are provided to the front-wheel axle case 96, and a rocking lock mechanism 112 for restricting the pivoting of the front-wheel axle case 96 by restricting the pivoting of the actuation bodies 111 is provided to the machine frame 6 (front frame 10).

The actuation bodies 111 are disposed in a pair front and behind the center in the left-right direction of the front-wheel axle case 96, and each actuation body 11 is bolted to an attachment part 113 provided to the front-wheel axle case 96.

The front and rear actuation bodies 111 pass through the horizontal wall part 98 of the connecting plate 93 and protrude upward, and a fitting part 114 that is open upward and to the front and rear is formed in the upper parts of the actuation bodies 111.

The rocking lock mechanism 112 is provided with a lock cylinder 115 disposed between the upper parts of the front and rear actuation bodies 111, and a switch valve 118 for switching two chambers 124A, 124B partitioned by a piston 117 inside a cylinder tube 116 of the lock cylinder 115 between a communicated state and a closed state (non-communicated state).

The lock cylinder 115 is disposed horizontally so that the axis inside a positioning opening 119 formed in the upper wall 91 of the front frame 10 coincides with the left-right direction. The lock cylinder 115 is primarily composed of the cylinder tube 116 filled with a fluid (oil in the present embodiment), the piston 117 accommodated in the cylinder tube 116 so as to be able to move in the left-right direction, and a pair of left and right piston rods 120 fixed to the left and right sides of the piston 117 that protrude outward to the left and right from the cylinder tube 116.

The left and right piston rods 120 are attached to and supported by support plates 121 on the same sides in the left-right direction.

The left and right support plates 121 are provided upright on the horizontal wall part 98 of the connecting plate 93 of the front frame 10, and radial attachment grooves 122 are formed above and on the left and right sides of the center part of the upper part in the front-rear direction.

Attachment bolts 123 composed of headed bolts are threaded in the left-right direction on the outer ends of the left and right piston rods 120, and the left and right piston rods 120 are attached and fixed horizontally in the left-right direction on the side of the front frame 10 (machine frame 6) by inserting and fitting the shaft portions of the attachment bolts 123 from above the attachment grooves 122 of the support plates 121, and then tightening the attachment bolts 123.

A fitted part 126 for coupling and connecting the cylinder tube 116 to the actuation bodies 111 by being fitted onto the fitting parts 114 of the actuation bodies 111 from above is provided on the front and rear sides of the center part of the cylinder tube 116 in the left-right direction.

The fitted part 126 is composed of a pin having a central axis in the front-rear direction, and is fitted with the fitting part 114 of the actuation bodies 111 at the same time that the piston rods 120 are attached.

The switch valve 118 is composed of a two-port two-position switch valve 118, wherein one port is communicated via a hose or the like with one chamber 124A in the cylinder tube 116, the other port is communicated via a hose or the like with the other chamber 124B in the cylinder tube 116, and fluid (oil) is filled into the passage from one chamber 124A of the cylinder tube 116 to the other chamber 124B.

A pair of in/out ports 125A, 125B for allowing inflow and outflow of fluid with respect to the two chambers 124A, 124B of the cylinder tube 116 is provided to the upper surface of the cylinder tube 116.

In the rocking lock mechanism 112, the cylinder tube 116 is allowed to move left and right, and the front-wheel axle case 96 is allowed to pivot in the state in which the switch valve 118 is switched to the communicated state in which fluid flows from one chamber 124A of the cylinder tube 116 to the other chamber 124B. In the state in which the switch valve 118 is switched to the non-communicated state in which fluid does not flow from one chamber 124A of the cylinder tube 116 to the other chamber 124B, left-right movement of the cylinder tube 116 is restricted, and pivoting of the front-wheel axle case 96 is restricted (locked).

The lock cylinder 115 of the rocking lock mechanism 112 configured as described above is attached by fitting the attachment bolts 123 of the piston rods 120 in the attachment grooves 122 of the support plates 121 at the same time that the fitted part 126 of the cylinder tube 116 is fitted with the fitting part 114 of the actuation bodies 111 from above, and then tightening the attachment bolts 123. The lock cylinder 115 can thus be easily attached.

As assembly methods, the front-wheel axle case 96 to which the actuation bodies 111 are attached may be mounted to the front frame 10, and then the lock cylinder 115 may be mounted, or the lock cylinder 115 may first be mounted to the front frame 10, and then the front-wheel axle case 96 to which the actuation bodies 111 are attached may be mounted to the front frame 10.

In the present embodiment, the cylinder tube 116 is disposed horizontally, and the fluid in/out ports 125A, 125B provided to the cylinder tube 116 are formed on the upper surface of the cylinder tube 116. Therefore, when air accumulates in the cylinder tube 116, the air can be removed via the in/out ports 125A, 125B.

The rotating body 3 is provided with a rotation table 201 supported on the machine frame 6 so as to be able to swivel about a vertically directed swivel axis; a steering device 202 for the travel system, and an excavating implement 203 as a ground implement provided to the front part of the rotation table 201; a driver seat positioning frame 204 provided to the rear part of the rotation table 201; a driver seat 205 provided to the driver seat positioning frame 204; operating devices 206 for the excavating implement provided on the left and right sides of the driver seat 205; a control valve (switching valve of the operating devices 206) 207 and a counterweight 208 for the excavating implement that are provided to the driver seat positioning frame 204; and a ROPS (Roll Over Protective Structure) 209. The swivel axis X coincides with an axis line orthogonal to the axis between the front and rear wheels.

Figure 22:
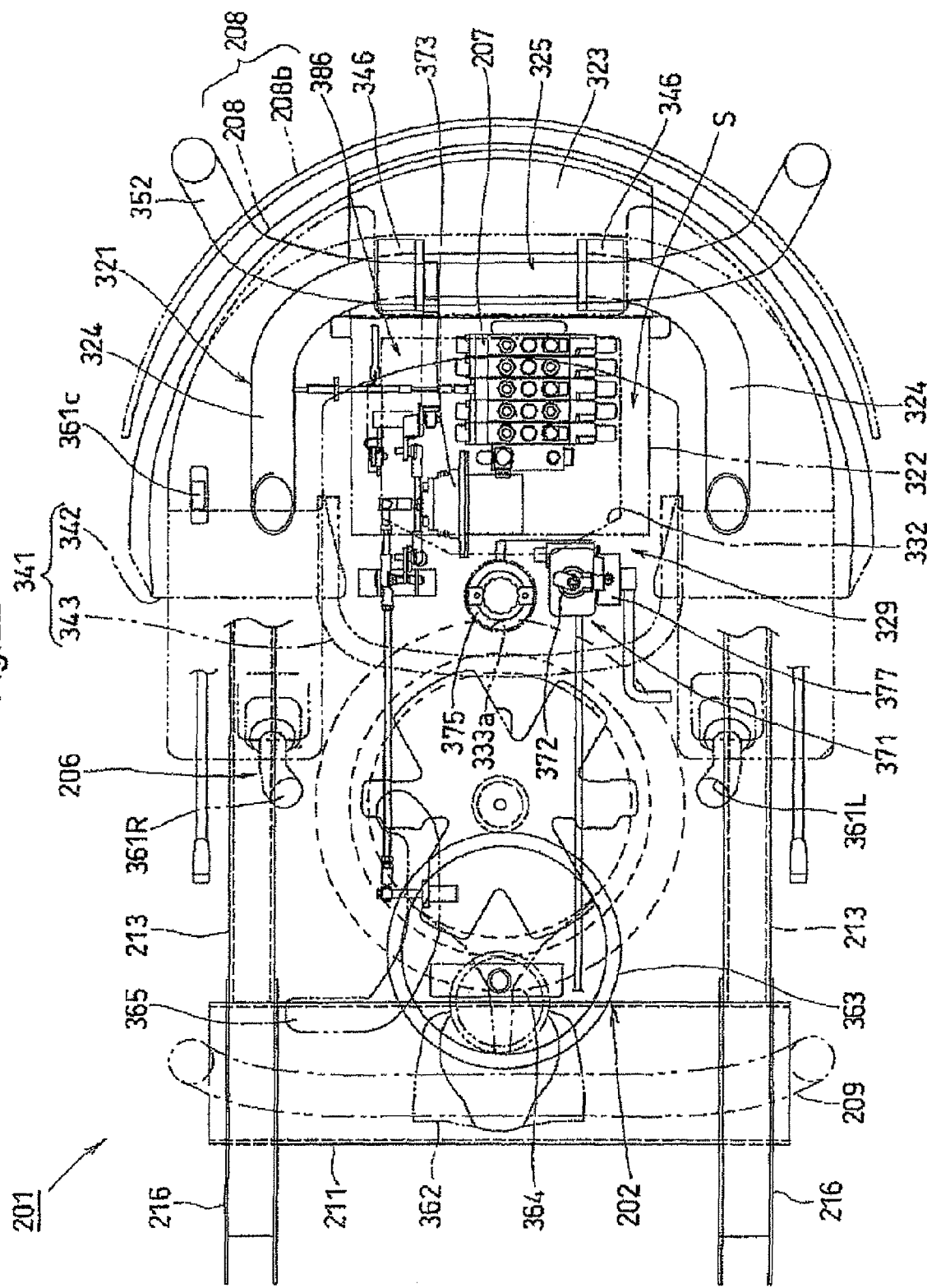
FIG. 22 is a plan view showing the driver seat and the surrounding area.
Figure 23:
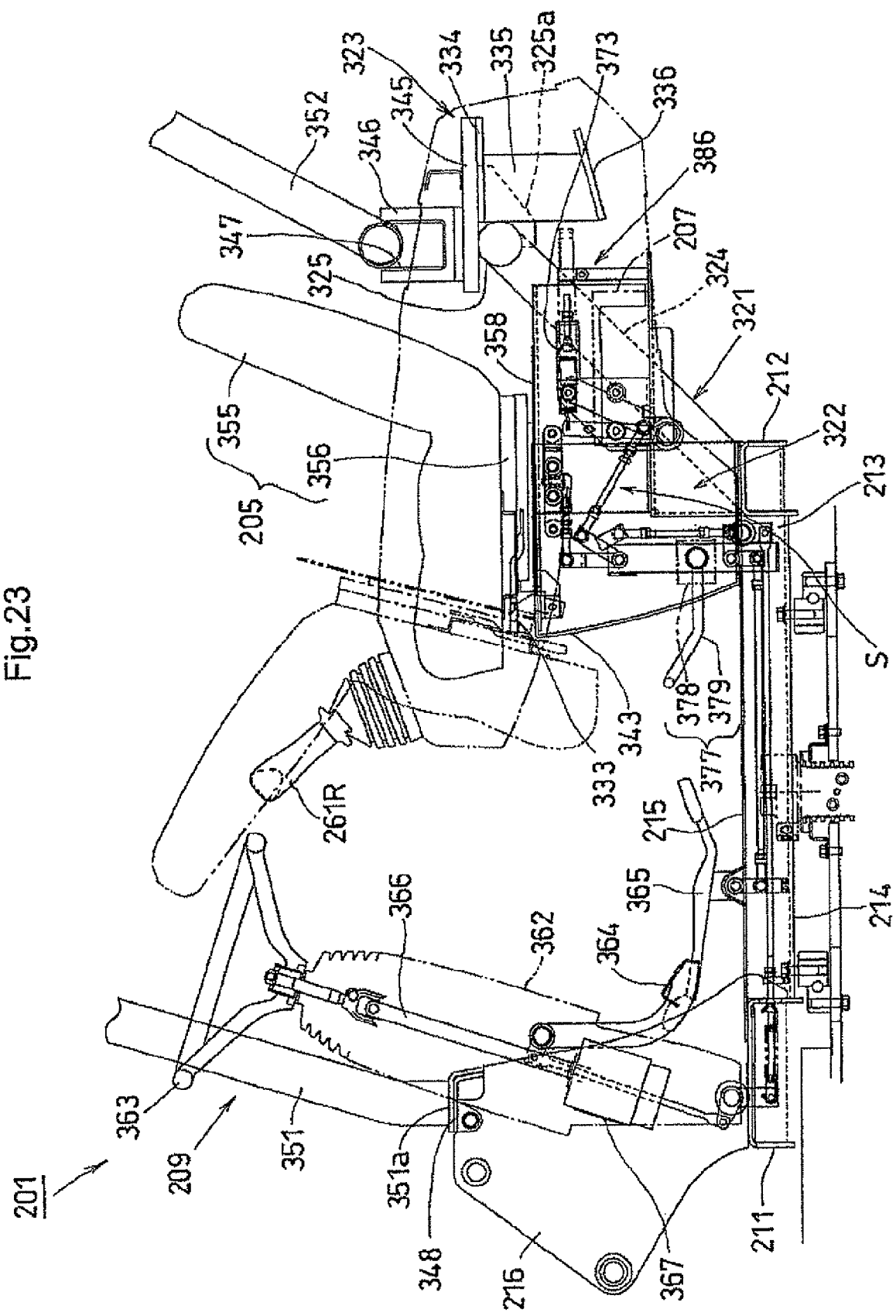
FIG. 23 is a left side view showing the driver seat and the surrounding area.

As shown in FIGS. 22 and 23, the front part of the rotation table 201 is flat, the left and right sides extend to the rear further outward than the machine frame 6, and the rear part and the left and right side parts are formed so as to be substantially rectangular.

The rotation table 201 is also provided with a front frame 211; a rear frame 212 positioned at a distance to the rear from the front frame 211; a pair of left and right side frames 213 for connecting the front frame 211 and the rear frame 212 on the left and right sides thereof; a lower wall 214 provided between the front and rear frames 211, 212 on the lower surface of the rotation table 201; and a step 215 (footrest) provided to the upper surface of the lower wall 214.

Masts (implement supports) 216 are provided upright on the left and right sides (left and right sides of the front frame part) on the upper surface of the front frame 211, and the excavating implement 203 is attached to the pair of left and right masts 216.

As shown in FIGS. 1 and 16 through 21, the excavating implement 203 has a pair of left and right booms 241 pivotably connected to the upper parts of the left and right masts 216 so as to be able to rotate about a left-right axis; a pair of left and right arms 242 whose proximal sides are pivotably connected to the distal ends of the left and right booms 241 so as to be able to rotate about a left-right axis; a bucket 243 as an attachment tool for ground work that is provided to the distal ends of the left and right arms 242; a pair of left and right boom cylinders 244 for pivoting the left and right arms 241 vertically about a pivot point; a pair of left and right arm cylinders 245 for pivoting the left and right arms 242 to the front and rear about a pivot point; and a single bucket cylinder 246 for pivoting the bucket 243.

The bucket cylinder 246, the arm cylinders 245, are composed of hydraulic cylinders.

The proximal sides of the left and right arms 242 are connected by connecting members 247 that are composed of pipes disposed along the left-right direction, and one end (the piston top of the cylinder main body) of the bucket cylinder 246 is pivotably connected to a bracket 248 so as to be able to rotate about a left-right axis, and the bracket 248 is provided in the center of the connecting members 247 in the left-right direction.

A support body 249 for supporting the bucket 243 is provided to the distal ends of the left and right arms 242.

The 249 is composed of a plate material having a surface in the left-right direction. The bucket 243 is supported at the front surface of the support body 249. Attachment brackets 250 are provided to the left and right sides of the back surface of the support body 249, and the distal ends of the arms 242 on the same sides in the left-right direction are pivotably connected to the lower parts of the left and right attachment brackets 250 so as to be able to rotate about a left-right axis via a horizontal shaft 251.

A support shaft 252 having a central axis in the left-right direction is provided so as to be able to rotate about the central axis, and connects the left and right arms 242 nearer the proximal part than the horizontal shaft 251 at the distal ends of the arms 242. One end of a first link 253 is connected in the center in the left-right direction of the support shaft 252. A second link 254 is pivotably connected to the other end of the first link 253 so as to be able to rotate about a left-right axis. The other end of the second link 254 is pivotably connected to a bracket 255 so as to be able to rotate about a left-right axis, and the bracket 255 is provided in the center in the left-right direction of the back surface of the support body 249.

The other end (on the side of the distal end of the piston rod) of the bucket cylinder 246 is pivotably connected to a midportion of the first link 253 so as to be able to rotate about a left-right axis. Through the extension and retraction of the bucket cylinder 246, the bucket 243 pivots about the horizontal shaft 251 (about a left-right axis), and the bucket 243 is capable of scooping/dumping or raking/dumping operation.

The bucket 243 is supported by the support body 249 so as to be able to rotate about a rotation shaft 257 having a central axis Y perpendicular to the bucket 243 (attachment tool support surface 256) of the support body 249. The bucket 243 is capable of rotating 180° about the central axis Y of the rotation shaft 257 from a first work orientation that allows scooping as shown in FIG. 15A, to a second work orientation that allows raking as shown in FIG. 15B through the use of a rotation means 258 provided between the bucket 243 and the support body 249.

The rotation means 258 has a cylinder tube 259 fixed to the support body 249, a piston 260 accommodated in the cylinder tube 259, and the rotation shaft 257 fixed to the bucket 243 and inserted into the piston 260.

The cylinder tube 259 has the central axis Y of the rotation shaft 257 of the bucket 243 as the central axis thereof, and is inserted in the support body 249 so as to protrude to the front and rear of the support body 249. The cylinder tube 259 is bolted to the support body 249, the front surface thereof is open, and in/out ports 261A, 261B for pressure oil are formed in the front and rear thereof.

The rotation shaft 257 is inserted from the front surface of the cylinder tube 259. The rotation shaft 257 is primarily composed of a front attachment part 262 for blocking the opening at the front surface of the cylinder tube 259, and a midportion-to-rear shaft part 263 formed so as to have a smaller diameter than the attachment part 262. In this rotation shaft 257, the attachment part 262 and the rear end of the shaft part 263 are supported by the cylinder tube 259 so as to be able to rotate about a central axis, and the rear end of the shaft part 263 is attached by a bolt to the cylinder tube 259 so as to be incapable of moving in the central axis direction.

An attachment plate 264 is bolted to the attachment part 262 of the rotation shaft 257, and the attachment plate 264 is bolted to the back wall 265 of the bucket 243, whereby the rotation shaft 257 is attached and fixed so as to be able to rotate integrally with the bucket 243.

The piston 260 is formed in a cylindrical shape, fitted into the cylinder tube 259 so as to be able to move in the central axis direction but not rotate about the central axis, and is fitted onto the shaft part 263 of the rotation shaft 257 so as to be able to move in the central axis direction but not rotate in relative fashion about the central axis.

Screws 266, 267 for meshing with each other and converting linear movement of the piston 260 into rotation of the rotation shaft 257 are formed on the external peripheral side of the shaft part 263 of the rotation shaft 257, and the internal peripheral side of the piston 260. Pressure oil is fed into the cylinder tube 259 from one or the other of the in/out ports 261A, 261B of the cylinder tube 259, whereby the piston 260 moves linearly in the central axis direction, and the rotation shaft 257 rotates about the central axis through the meshing of the screw 267 on the internal peripheral side of the piston 260, and the screw 266 on the external peripheral side of the shaft part 263 of the rotation shaft 257.

The piston 260 moves from one end to the other end, and the bucket 243 can thereby rotate by 180°.

In the example shown in the drawings, the piston 260 is set so that the bucket 243 is in the first work orientation when the piston 260 is positioned at a slight distance (about 3 mm) from the stroke end at the front end (one end), and the bucket 243 is in the second work orientation when the piston 260 is positioned at a slight distance (about 3 mm) from the stroke end at the rear end (other end).

A rotation restriction means 268 is provided to the excavating implement 203. In the first work orientation, the rotation restriction means 268 restricts rotation (first-direction rotation of the bucket 243) of the bucket 243 in the direction (indicated by the arrow A in FIG. 21) of rotation from the second work orientation to the first work orientation, and allows the bucket 243 to rotate in the direction opposite from the first-direction rotation A. In the second work orientation, the rotation restriction means 268 restricts rotation (second-direction rotation of the bucket 243) of the bucket 243 in the direction (indicated by the arrow B in FIG. 21) of rotation from the first work orientation to the second work orientation, and allows the bucket 243 to rotate in the direction opposite from the second-direction rotation B.

The rotation restriction means 268 is provided with locking parts 269 that rotate integrally with the bucket 243, and first lock-receiving parts 270 and second lock-receiving part 271 provided to the support body 249 that lock the locking parts 269.

The locking parts 269 are composed of pins having a central axis in the left-right direction, and are fixed to brackets 272 that are fixed to the back wall 265 of the bucket 243.

The first lock-receiving parts 270 and the second lock-receiving parts 271 are hook shaped and fixed to the front surface of the support body 249. The first lock-receiving parts 270 are open in the direction of the second-direction rotation B of the bucket 243, and lock the locking parts 269 in the first work orientation so as to restrict the first-direction rotation A of the bucket 243 and allow the second-direction rotation B of the bucket 243. The second lock-receiving parts 271 are open in the direction of the first-direction rotation A of the bucket 243, and lock the locking parts 269 in the second work orientation so as to restrict the second-direction rotation B of the bucket 243 and allow the first-direction rotation A of the bucket 243.

The locking parts 269, the first lock-receiving parts 270, and the second lock-receiving parts 271 are formed so as to receive the load that acts on the bucket 243 during excavation work, and a plurality thereof (four each in the present embodiment) is formed on the periphery of the rotation means 258. The share of the load exerted on the rotation shaft 257 from the bucket 243 during excavation work can thereby be reduced.

An orientation retention means 273 for retaining the bucket 243 in the first work orientation and the second work orientation is provided to the excavating implement 203.

The orientation retention means 273 is disposed on the back surface of the support body 249. The orientation retention means is supported so as to be able to move along a bucket support surface 256 of the support body 249, and the distal end thereof has an engaging member 276 capable of protruding and retracting from the external peripheral edge of the support body 249, and engagement-receiving parts 277 provided in two locations 180° apart about the rotation shaft 257 toward the attachment tool that engage with the engaging member 276 protruding from the external periphery of the support body 249 and restrict the rotation of the bucket 243 in the first and second work orientations.

The engaging member 276 is composed of a pin tapered at the distal end thereof and fixed to a bracket 279 in which a guide cylinder 278 for guiding the engaging member 276 to allow movement thereof in the protrusion and retraction direction is fixed to the back surface of the support body 249, and the engaging member 276 is passed through the bracket 279 and inserted through the guide cylinder 278.

The engagement-receiving parts 277 are formed in a cylindrical shape that is engaged by the insertion of the distal end of the engaging member 276, and are formed in a tapered shape in which the internal peripheral side matches the tapered shape of the distal end of the engaging member 276.

The engagement-receiving parts 277 are fixed to attachment members 280 that are attached and fixed to the back wall 265 of the bucket 243.

A release lever 281 for releasing the engaging member 276 from the engagement-receiving parts 277 and releasing the engagement thereof is provided beside the base part of the engaging member 276.

The release lever 281 is formed in a curved V shape, and the curved portion thereof is attached to a stepped attachment shaft 282 fixed to the support body 249 so as to allow rotation about a central axis parallel to the central axis of the rotation shaft 257.

An engaging block 283 attached so as to be able to rotate about an axis parallel to the rotational axis of the release lever 281 is provided to one end of the release lever 281.

The release lever 281 is subjected to rotation resistance by the urging force of a spring member 285 composed of a compression coil spring that is installed between the release lever 281 and a spring bearing 284 that is fitted onto the end part of the attachment shaft 282.

One end of the release lever 281, and the proximal end of the engaging member 276 are coupled and connected by a coupling member 286.

One end of the coupling member 286 is pivotably connected to the proximal end of the engaging member 276, and the other end of the coupling member 286 is formed in a rod shape. The rod part 287 is inserted through the engaging block 283 at one end of the release lever 281, a male screw 288 is formed at the end part of the rod part 287, and a nut 289 is threaded thereon.

A spring member 291 composed of a compression coil spring is disposed so as to fit over the rod part 287 between the engaging block 283 and a spring bearing step 290 provided to one end of the coupling member 286.

The support body 249 is provided with a contacting wall 292 with which one end of the release lever 281 comes in contact so as to restrict rotation (counterclockwise rotation of the release lever 281 in FIG. 20B) of the release lever 281 due to the urging force of the spring member 291 fitted over the rod part 287 when the engaging member 276 is engaged with the engagement-receiving parts 277. When the engaging member 276 is engaged with the engagement-receiving parts 277, the spring member 291 fitted over the rod part 287 urges the engaging member 276 toward engaging with the engagement-receiving parts 277.

When the engaging member 276 is engaged with the engagement-receiving parts 277, the other end of the release lever 281 is rotated clockwise in FIG. 20B, whereby the engaging block 283 comes in contact with the nut 289 and pulls the coupling member 286. The engaging member 276 is thereby pulled in the release direction, the engagement of the engaging member 276 with the engagement-receiving parts 277 is released, and the bucket 243 is allowed to rotate.

The support body 249 is provided with a stopper 293 for restricting rotation of the release lever 281 in the direction in which the engaging member 276 is released from the engagement-receiving parts 277.

The release lever 281 is coupled and connected to a remove operating lever provided in the vicinity of the driver seat 205 via a push-pull cable or other coupling member 294. The release lever 281 is remotely operated from the driver seat 205 by a remote operating means composed of the remote operating lever, the coupling member 294, and other components, or is operated by a manual lever provided to the support body 249.

When a manual lever for operating the release lever 281 is provided to the support body 249, the manual lever can be operated from the rotation table 201 by raising the booms 241 and pivoting the arms 242 to the rear to fold the excavating implement 203.

In the excavating implement 203 of the present embodiment configured as described above, there is minimal load on the rotation shaft 257 during excavation, and the rotation shaft 257 can therefore be narrow, and the cylinder tube 259 (rotation means 258) can be small sized.

Cost increases when the rotation means 258 is composed of a motor. However, in the bucket 243 of the present embodiment, it is sufficient insofar as the bucket 243 can be changed to the two positions of the first work orientation and the second work orientation, and the rotation means 258 is composed of the cylinder tube 259, the piston 260, and the rotation shaft 257, whereby the structure can be simplified, and the rotation means 258 can be formed at low cost.

The limitation of manufacturing the leads of the screws 266, 267 can be eliminated by making the rotation shaft 257 into a cast article composed of FC or another material.

In the rotating body 3, the lower wall 214 of the rotation table 201 is mounted on the inner race 87 of the rotation bearing 16 and bolted, the rotation table 201 is supported by the rotation bearing 16 so as to be able to swivel about the swivel axis X on the traveling body 2, and the rotating body 3 in the present embodiment is capable of swiveling through the full range to the left and right.

In the traveling body 2 as shown in FIG. 1, the engine 7 is positioned in the rear part so that the rotation table 201 is positioned lower even when the engine 7 is mounted, and the traveling system power transmission mechanism 8 is positioned further forward than the engine 7. The vertical dimension of the portion of the traveling body 2 that faces the rotation table 201 is thereby reduced.

In the rotating body 3 as shown in FIG. 1, the upper surface of the step 215 of the rotation table 201 is provided on the traveling body 2 so as to be lower than the upper surface of the engine 7 in the traveling body 2. The vehicle height is thereby minimized while the height of the operating space of the rotating body 3 is maintained, and the swiveling work machine 1 as a whole can be made compact in the vertical direction. The center of gravity of the swiveling work machine 1 is maintained in a low position, whereby stability is enhanced, and the burden on the operator when entering and exiting the rotating body 3 is reduced.

The swiveling work machine 1 is made compact in the vertical direction even when the rotating body 3 is mounted on the traveling body 2 in a state in which the upper surface of the step 215 is slightly higher than the upper surface of the engine 7, and by providing the rotating body 3 on the traveling body 2 in a state in which at least the upper surface of the rotation bearing 16 provided to the rotation table 201 is lower than the upper surface of the engine 7, the stability and vertical compactness of the entire swiveling work machine 1 can be enhanced.

When the rotating body 3 is in the forward orientation, the counterweight 208 and the rear part of the driver seat positioning frame 204 are positioned above the engine 7 provided to the traveling body 2.

The distance L1 from the rotation axis X to the rear end of the rotating body 3 is thereby substantially within the distance L2 from the rotation axis X to the rear end of the rear wheels. Collision with an obstacle to the rear is thereby prevented even when the rotating body 3 is rotated.

Figure 24:
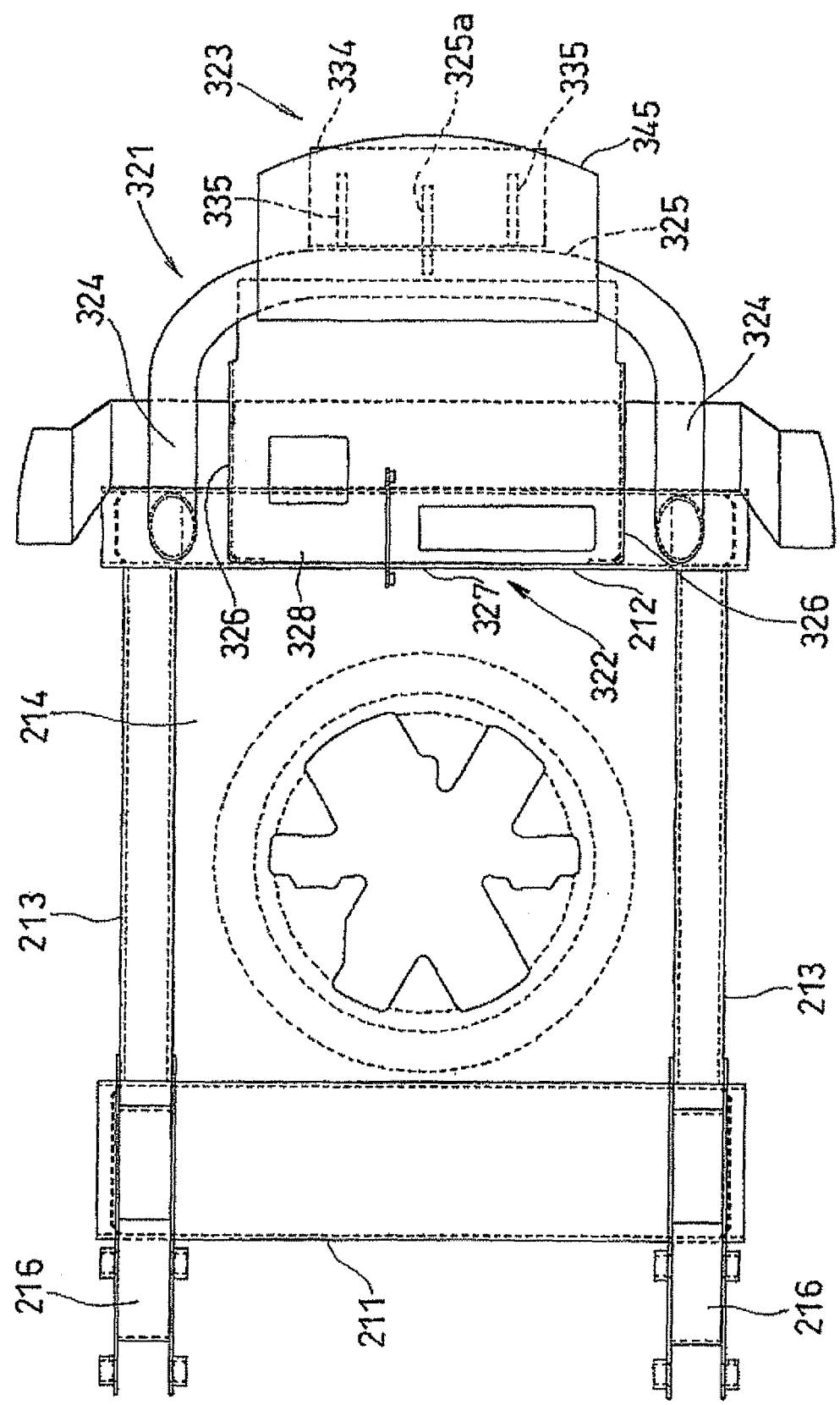
FIG. 24 is a plan view showing the rotation table.
Figure 25:
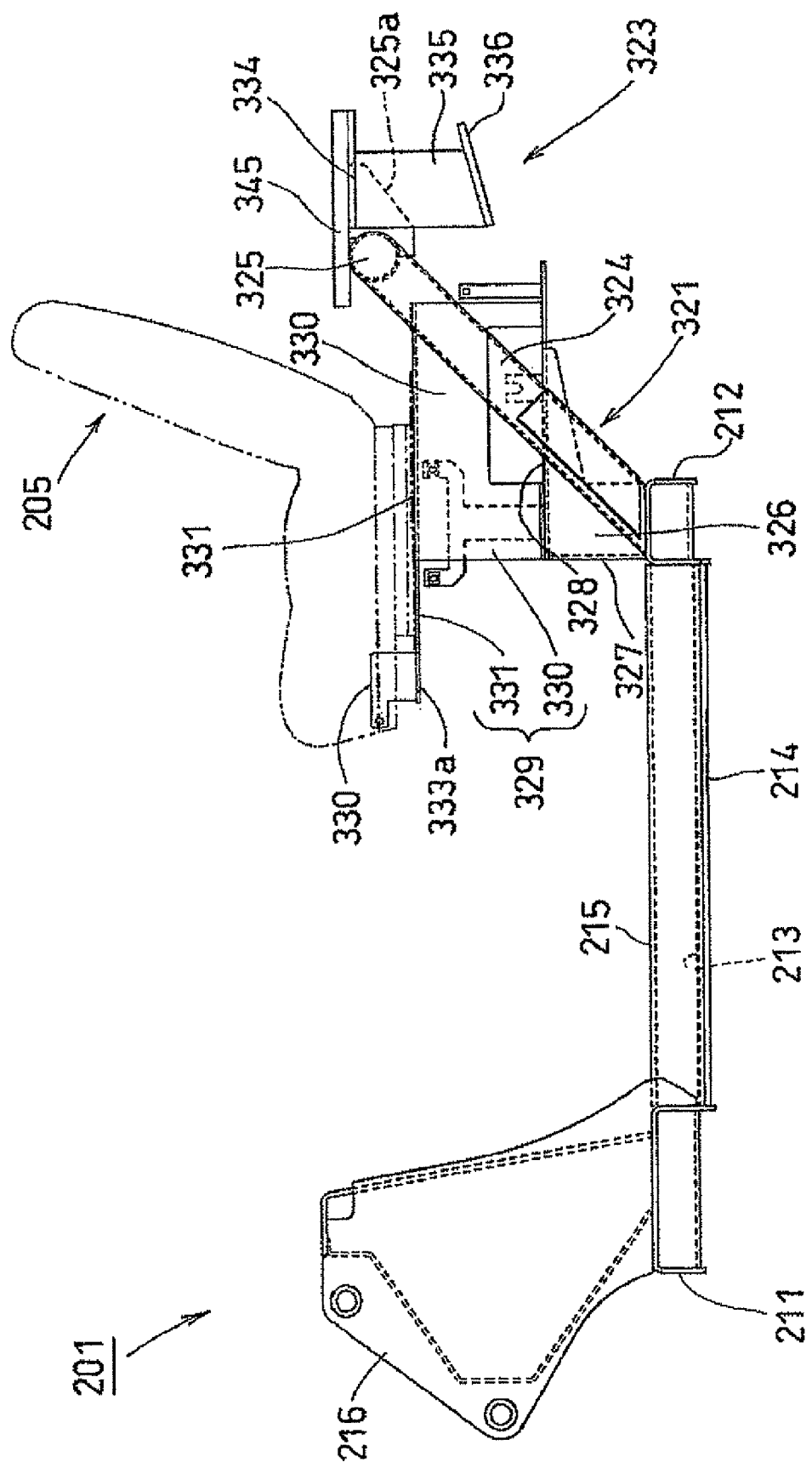
FIG. 25 is a left side view showing the rotation table.

As shown in FIGS. 24 and 25, the driver seat positioning frame 204 is provided with a support frame 321 fixed to the rotation table 201, a mounting table 322 attached to the support frame for mounting the driver seat 205 so that the driver seat 205 can be pivoted and tilted forward, and a weight attachment frame 323 for attaching the counterweight 208.

The support frame 321 extends across a pair of left and right connecting portions in which the side frames 213 are connected to the rear frame 212 of the rotation table 201. The support frame 321 is formed in a bracket shape and has a pair of left and right diagonal parts 324 that extend upward and to the rear of the rotation table 201 from the connecting portions, and connecting parts 225 for connecting the rear end parts of the pair of left and right diagonal parts 324, and the mounting table 322 is provided at the front of the connecting parts 225 and between the pair of left and right diagonal parts 324.

The mounting table 322 is provided with a pair of left and right side walls 326 provided along the pair of left and right diagonal parts 324 of the support frame 321; a front wall 327 provided upright from the rotation table 201 so as to connect the front edges of the pair of left and right side walls 326; an upper wall 328 that connects the pair of left and right side walls 326 and the edge of the upper end of the front wall 327 and extends to the area below the connecting part 325 of the support frame 321; and a seat table 329 provided to the upper surface of the upper wall 328 to support the driver seat 205.

The seat table 329 is composed of a pair of left and right legs 330 that extend along the edges of the upper ends of the pair of left and right side walls 326; and a flat plate part 331 that connects the upper end parts of the pair of left and right legs 330 and extends toward the front of the rotation table 201. As shown in FIG. 22, the flat plate part 331 is provided with an opening 332 in the position opposite the upper wall 328. As shown in FIG. 25, a pair of left and right support fixtures 333 for supporting the driver seat 205 is provided in positions further toward the front of the rotation table 201 than the opening 332, and a small window 333a is opened between the support frames.

The weight attachment frame 323 is supported by the connecting part 325 of the support frame 321. The weight attachment frame 323 is provided with an upper frame part 334 for covering the connecting part 325 from above, a pair of left and right side frame parts 335 that extend downward from the lower surface of the upper frame part 334, and a lower frame part 336 that connects the lower ends of the side frame parts 335 and extends to the left and right, and the upper frame part 334 is fastened via a bolt or other fastener to an attachment fixture 325a welded to the connecting part 325 of the support frame 321, whereby the weight attachment frame 323 is attached to the support frame 321.

As shown in FIGS. 1 and 22, the counterweight 208 is connected via a fastener to the lower frame part 336 of the weight attachment frame 323, and is provided with a lower weight 208a that covers the rear part of the mounting table 322 and the rear parts of the diagonal parts 324 of the support frame 321 from below, and an upper weight 208b connected to the pair of left and right side frame parts 335 and the lower frame part 336 of the weight attachment frame 323 by fasteners and covers the rear parts of the diagonal parts 324 of the support frame 321 and the rear parts of the connecting part 325 and mounting table 322 from the rear. The upper and lower weights 208a, 208b can be attached and detached as appropriate according to the work conditions or the weight of the excavating implement 203, and can be replaced by a cover (not shown) or the like composed of resin, for example.

Figure 2:
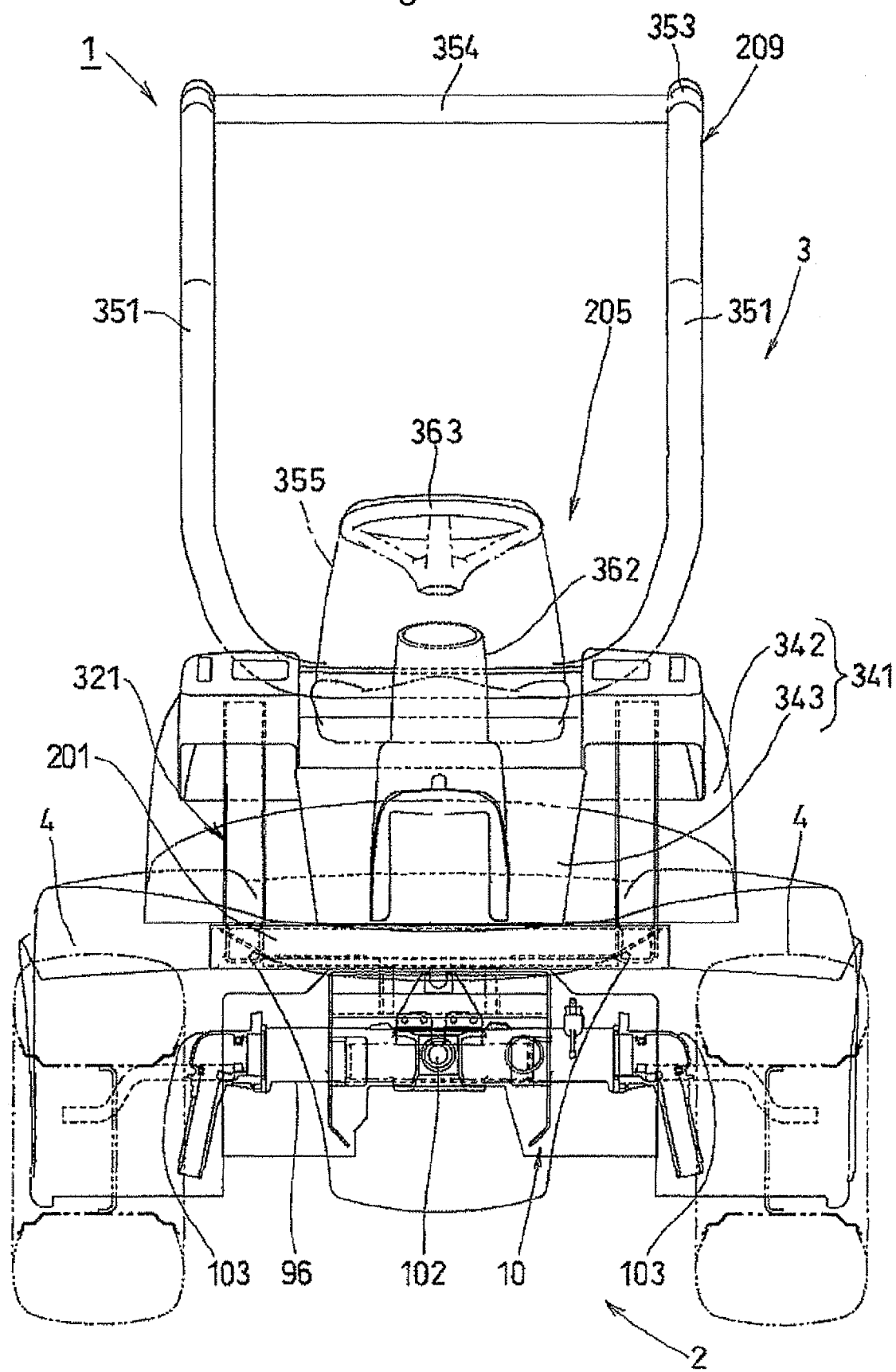
FIG. 2 is a front view showing the swiveling work machine.
Figure 3:
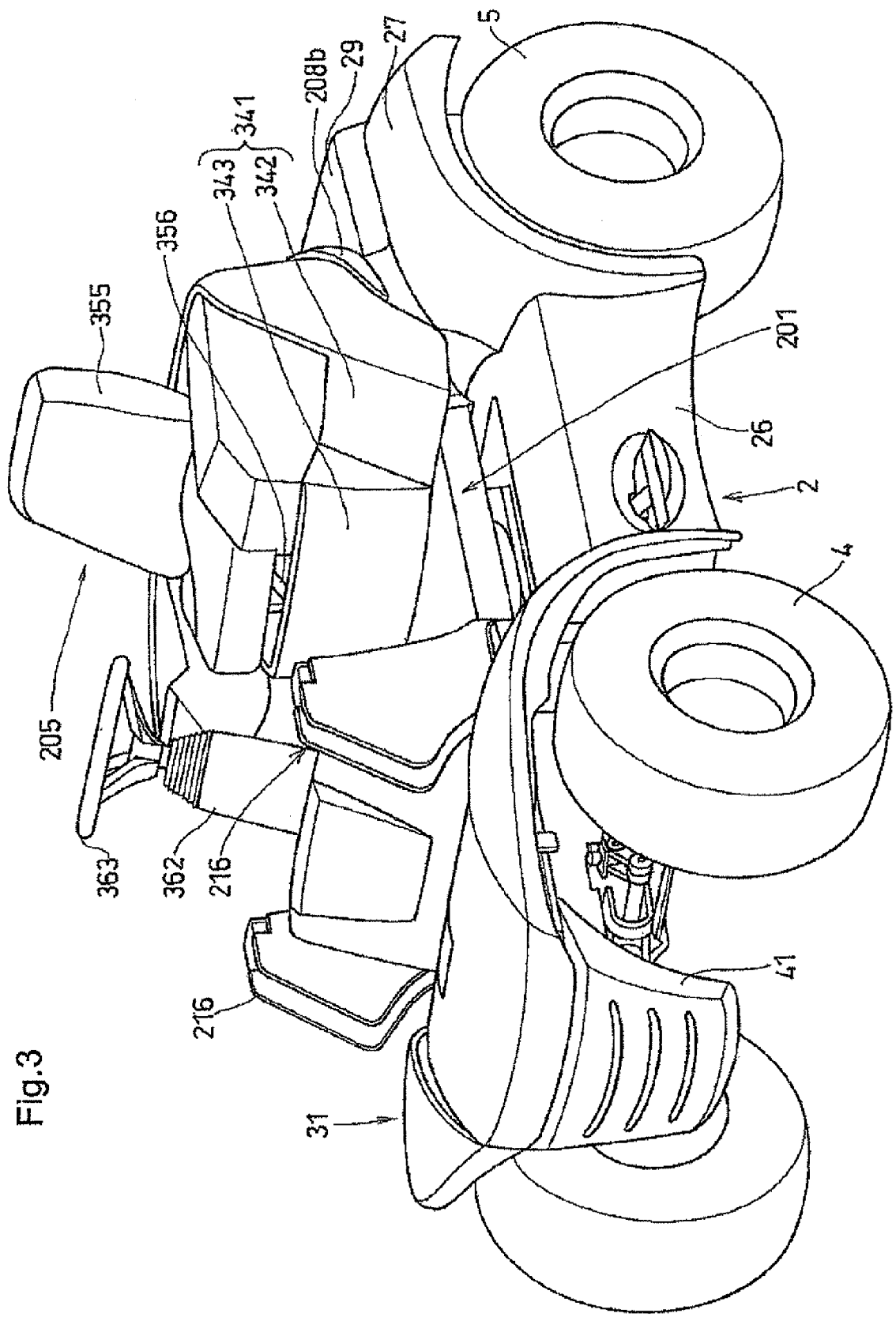
FIG. 3 is a perspective view showing the traveling body and the rotation table.
Figure 4:
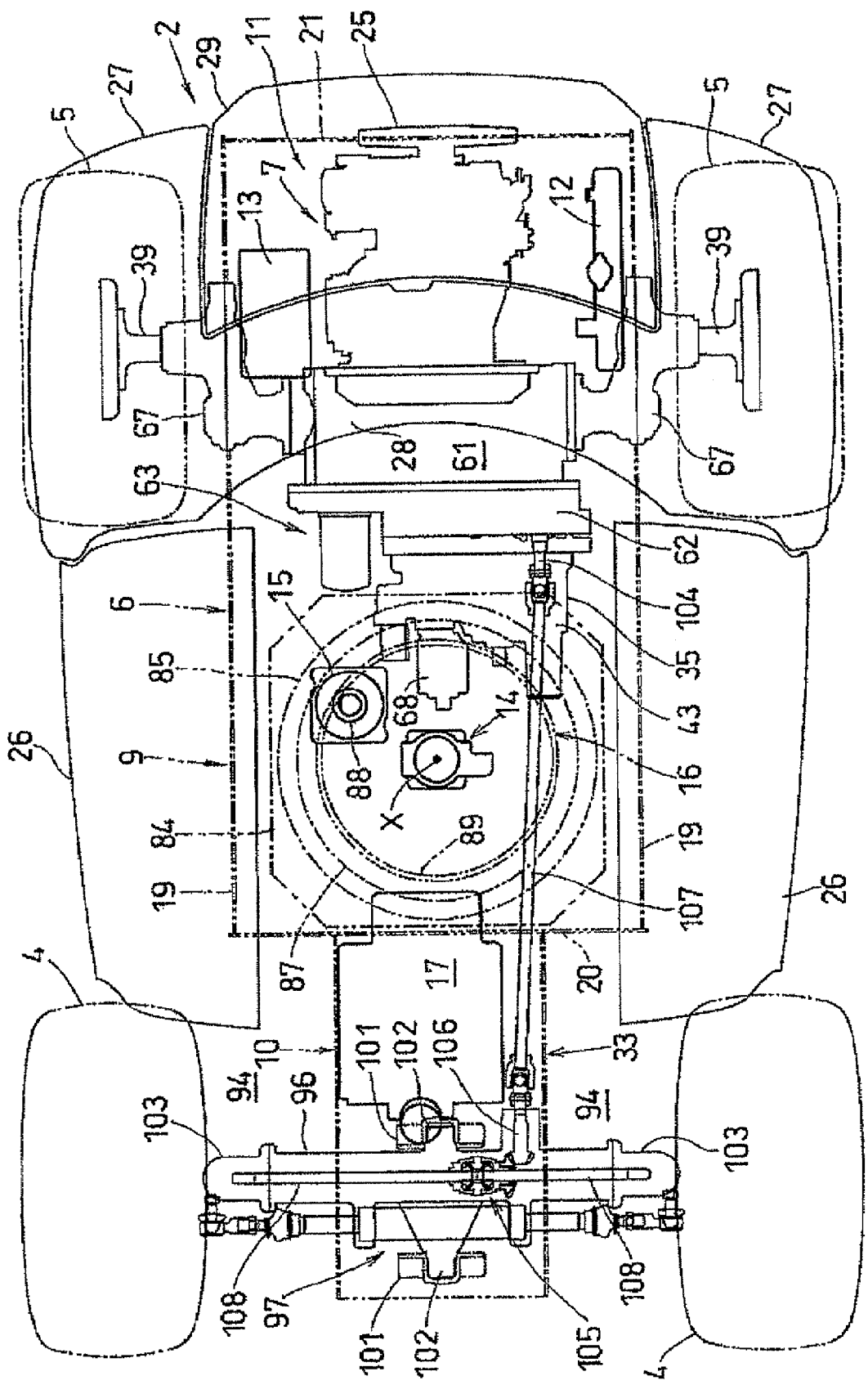
FIG. 4 is a plan view showing the traveling body.
Figure 5:
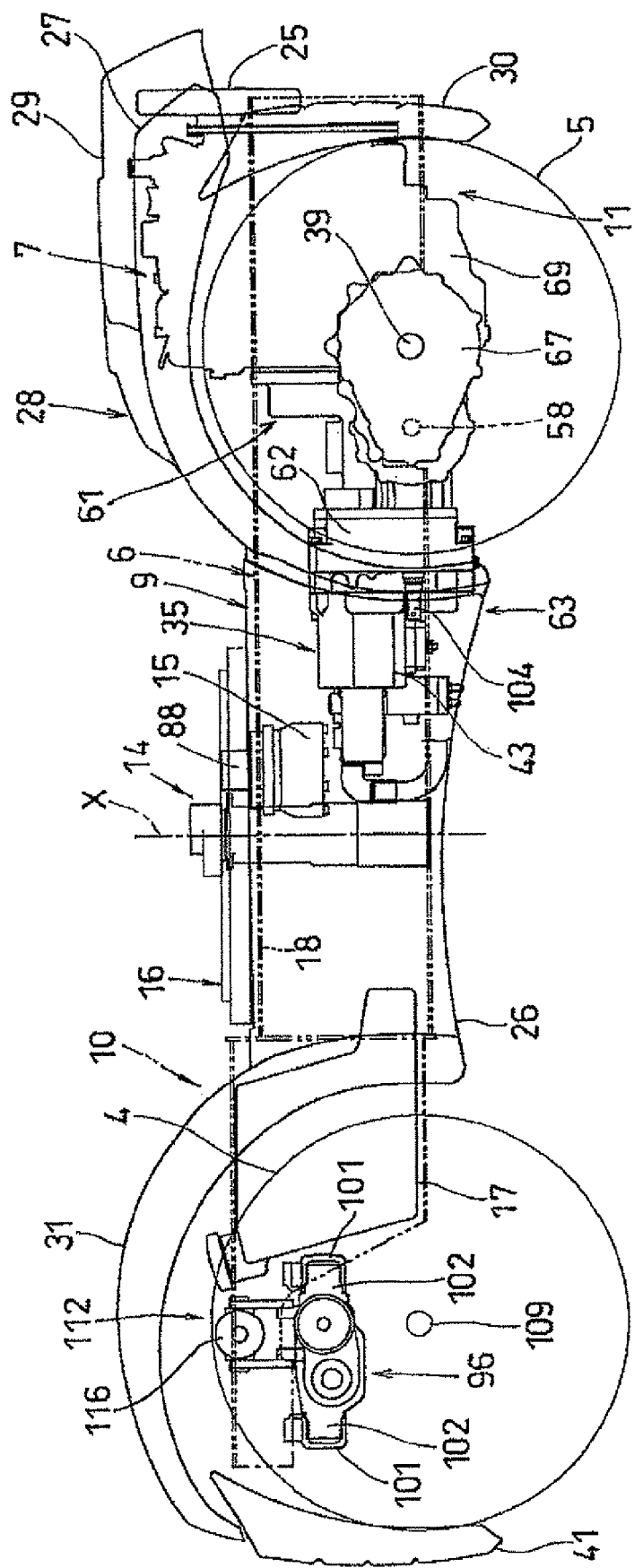
FIG. 5 is a left side view showing the traveling body.
Figure 6:
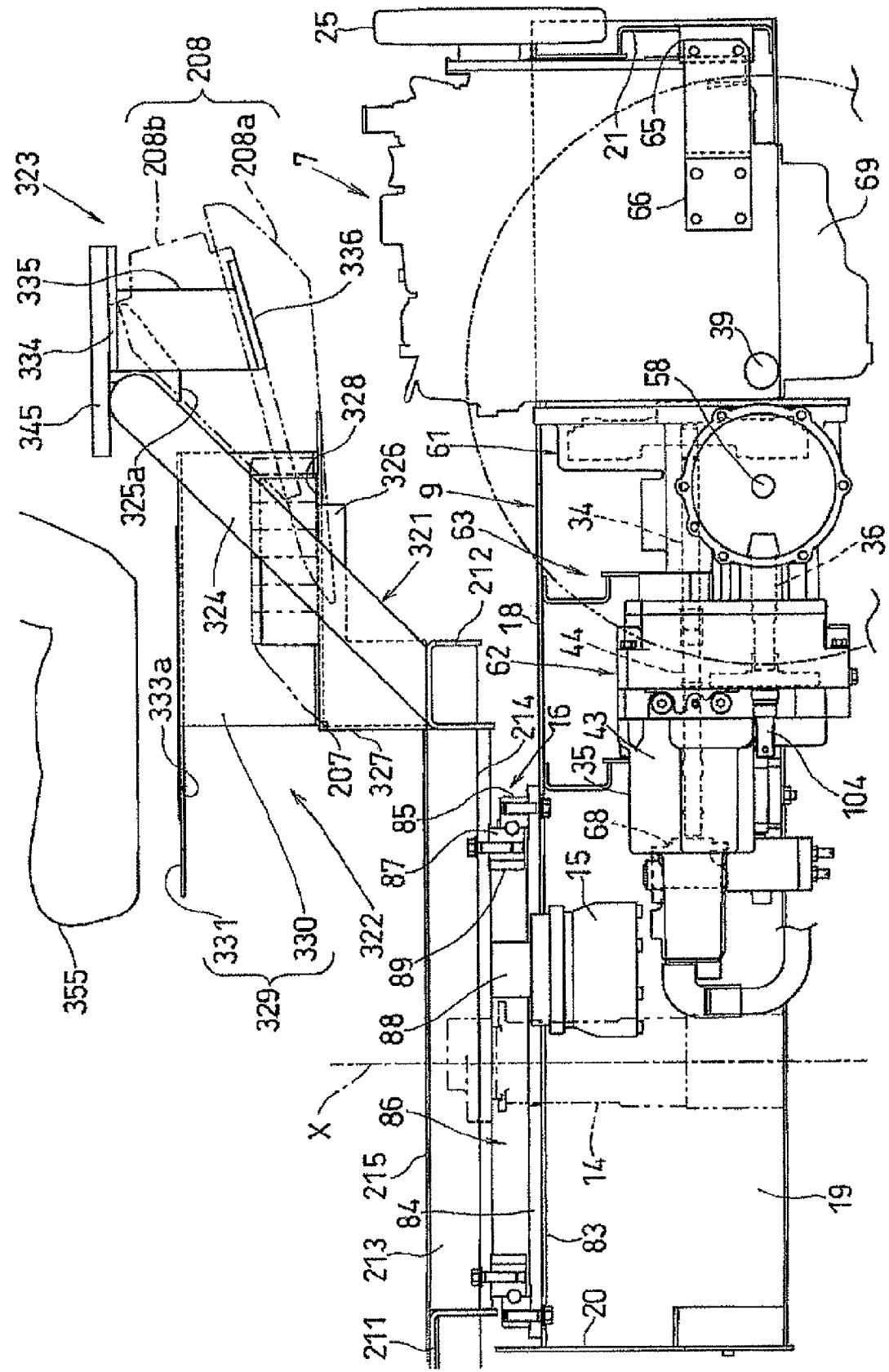
FIG. 6 is a left side view showing the rear upper part of the traveling body and the rear lower part of the rotating body.
Figure 7:
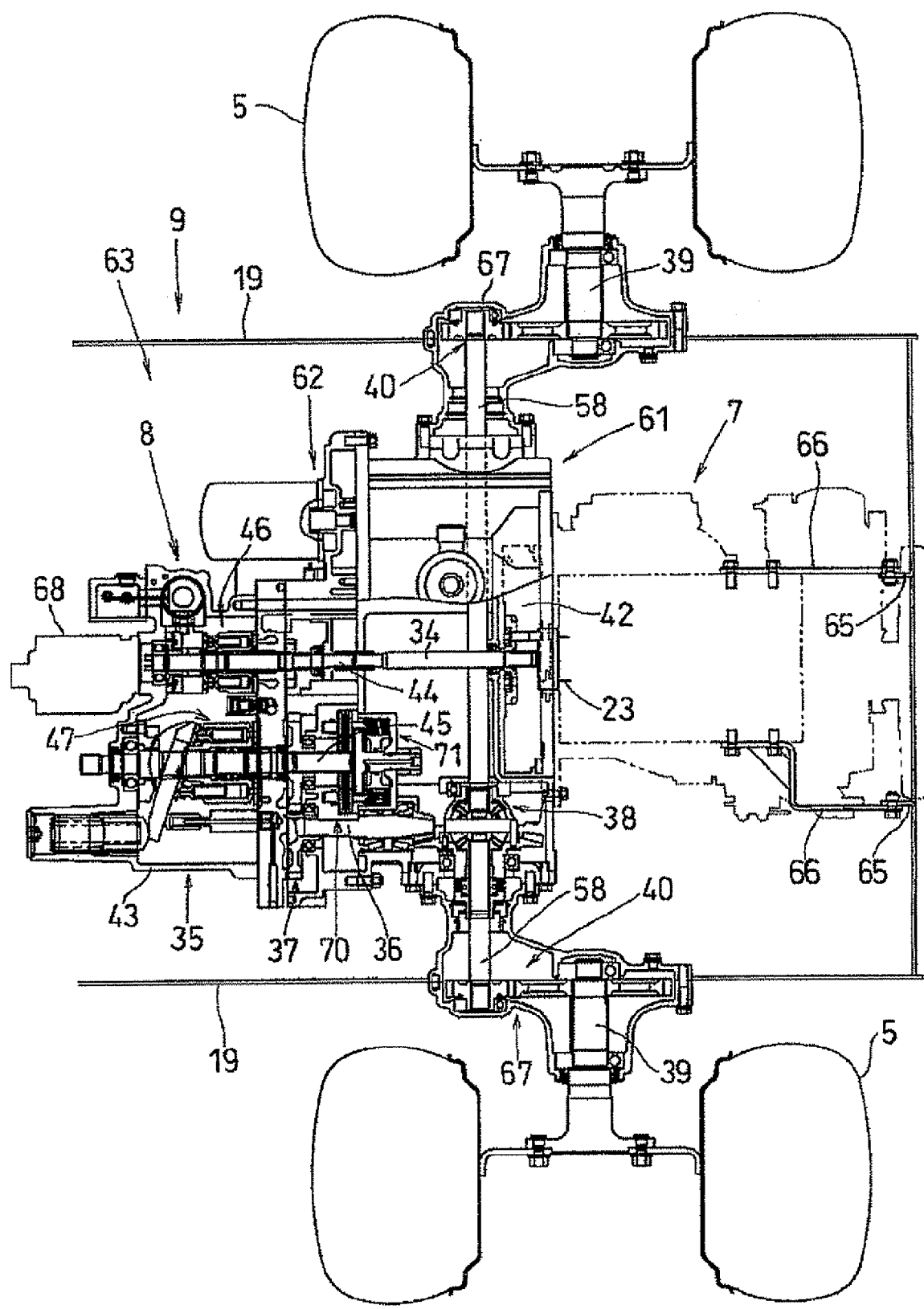
FIG. 7 is a plan view showing the rear wheels and the traveling system power transmission mechanism.

As shown in FIGS. 2 and 3, the driver seat positioning frame 204 is covered by a cover 341 provided so as to extend to the rear from below the driver seat 205. As shown in FIGS. 22 and 23, the cover 341 is provided with a main cover 342 provided so as to extend to the rear of the driver seat 205 from below the pair of left and right operating devices 206, and a sub-cover 343 for covering below the driver seat 205.

The sub-cover 343 faces the front wall 327 of the mounting table 322 at a prescribed distance, the lower edge thereof makes contact with the step 215, and both side edges face the side edge of the main cover 342, and the sub-cover 343 is provided in a state in which the upper edge covers the front edge of the seat table 329. The sub-cover 343 is attached to the step 215, the mounting table 322, and other components by bolts or other fasteners, and can be attached and detached in the attachment position without removing the main cover 342.

The upper surface of the upper frame part 334 of the weight attachment frame 323 is covered by a thick plate member 345 provided to the upper end of the attachment fixture 325a, and angled members 346 are provided to the left and right ends of the upper surface of the thick plate member 345. Groove-shaped rear ROPS supports 347 for supporting the ROPS 209 are formed at the upper ends of ascending parts of the angled members 346.

As shown in FIG. 23, front ROPS supports 348 are formed in a plane in the upper ends of the pair of left and right masts 216, and the ROPS 209 is supported by the pairs of left and right front ROPS supports 348 and rear ROPS supports 347 at the front and rear of the rotation table 201.

As shown in FIGS. 1 and 2, the ROPS 209 is formed by bending cylindrical steel pipes into a U shape. The ROPS 209 is provided with left and right front pillars 351 that extend upward from the front ROPS supports 348; left and right rear pillars 352 that extend upward from the weight attachment frame 323; and left and right beams 353 for connecting the upper ends of the front pillars 351 and the upper ends of the rear pillars 352; and the proximal ends of the pair of left and right rear pillars 352 are connected to each other. A plurality of connecting rods 354 for connecting the left and right beams 353 is provided to the ROPS 209, and a canopy (not shown) is attached to the top to provide shade.

As shown in FIG. 23, a plate-shaped connecting tab 351a is fixed to the lower ends of the pair of left and right front pillars 351 of the ROPS 209. The connecting tab 351a is fastened to the front ROPS supports 348 by fasteners, and the proximal ends of the left and right rear pillars 352 are supported by the rear ROPS supports 347, whereby the ROPS 209 is mounted to the rotation table 201.

The driver seat 205 is provided with a seat 355 in which the operator can sit, and a seat support 356 for supporting the seat 355 to allow adjustment of the seat position forward and backward, and a connecting fixture 357 connected to the support fixtures 333 of the seat table 329 is provided to the front part of the seat support 356.

The connecting fixture 357 is pivotably connected to the support fixtures 333 via a pivot pin (not shown) having a left-right axis, and the driver seat 205 is thereby mounted so as to be able to tilt forward about a front pivot point on the seat table 329 of the mounting table 322.

The seat support 356 is provided with a cover member 358 for covering the opening 332 of the seat table 329 in a state in which the driver seat 205 is mounted on the seat table 329. The opening 332 covered by the cover member 358 can thereby be uncovered by pivoting the driver seat 205 from the mounted state on the seat table 329 to a forward-tilted state, as indicated by the double-dashed line in FIG. 23. The uncovered opening 332 is then covered by the cover member 358 by pivoting the driver seat 205 from the forward-tilted state to the mounted state on the seat table 329.

The left and right legs 330 of the seat table 329 each support an operating lever 361 provided beside the driver seat 205 via support members (not shown). The operating levers 361L, 361R are operating devices 206 for the excavating implement. The left operating lever 361L operates the rotation table 201 and the arms 242 of the excavating implement. The right operating lever 361R operates the booms 241 and the bucket 243.

A bucket rotation lever 361C for enabling the bucket 243 to be rotated is provided behind the right operating lever 361R.

The steering device 202 of the traveling system is provided with a steering platform 362 positioned in the left-right center of the front part of the rotation table and between the pair of left and right masts 216; a steering wheel 363 and brake pedal 364 supported by the steering platform 362; and a forward/reverse switching pedal (accelerator pedal) 365 supported by the rotation table 201.

As shown in FIG. 23, the steering platform 362 is provided with a wheel post 366 for supporting the steering wheel 363; the power steering controller 367; and a tilt device (not shown) for allowing the forward and backward position of the steering wheel 363 to be adjusted. These members can be compactly installed on the rotation table 201 after being combined as a single assembly.

Figure 26:
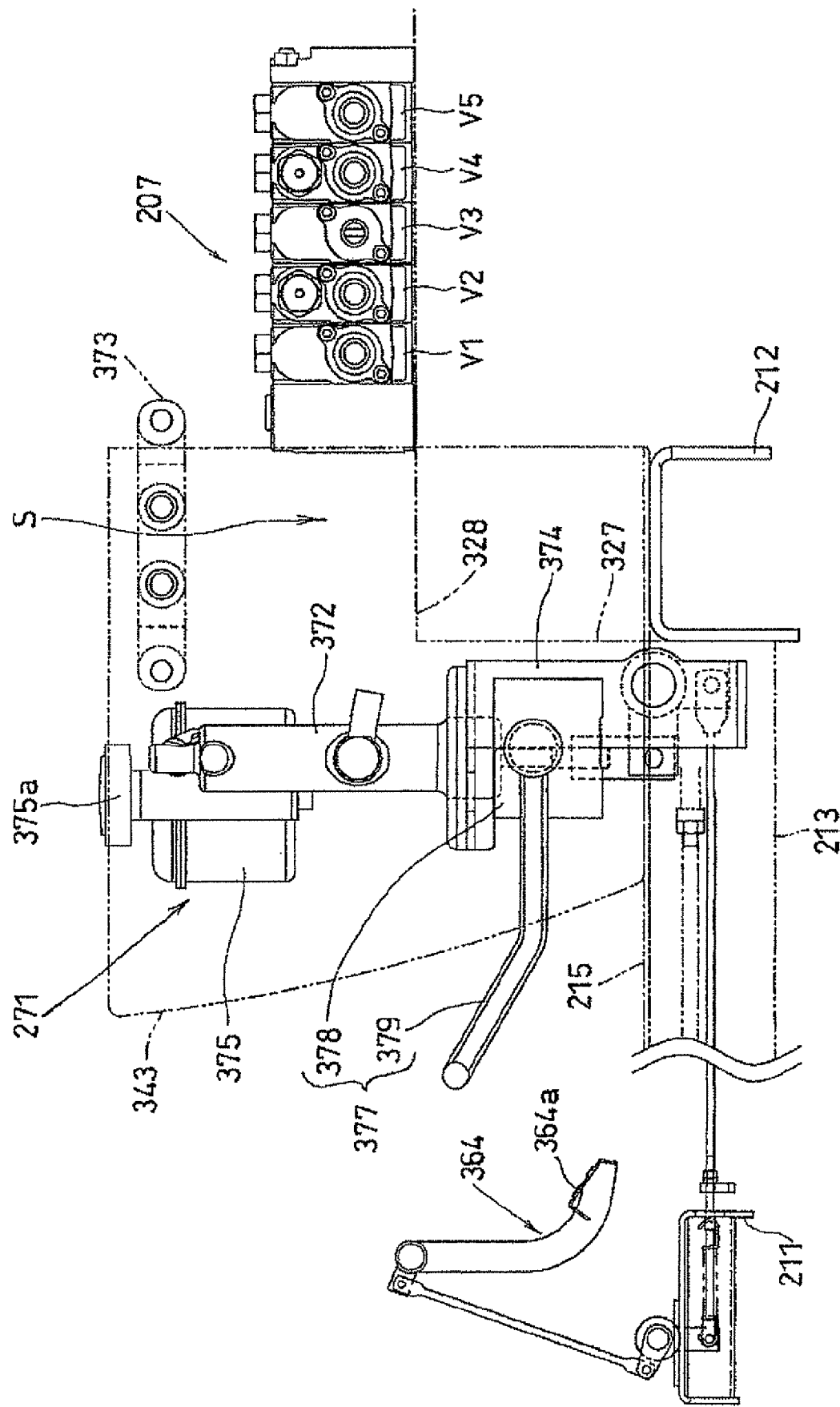
FIG. 26 is a left side view showing the area below the driver seat.

In the brake pedal 364 as shown in FIGS. 23 and 26, a stepping part 364a having a left-right length that is substantially the same or slightly larger than the left-right length of the steering platform 362 is provided behind the base part of the steering platform 362, and the brake pedal 364 is pivotably supported by a left-right oriented support shaft provided to the steering platform 362. The brake pedal 364 is also urged so as to be able to return to the pre-application position after application thereof is released.

Figure 27:
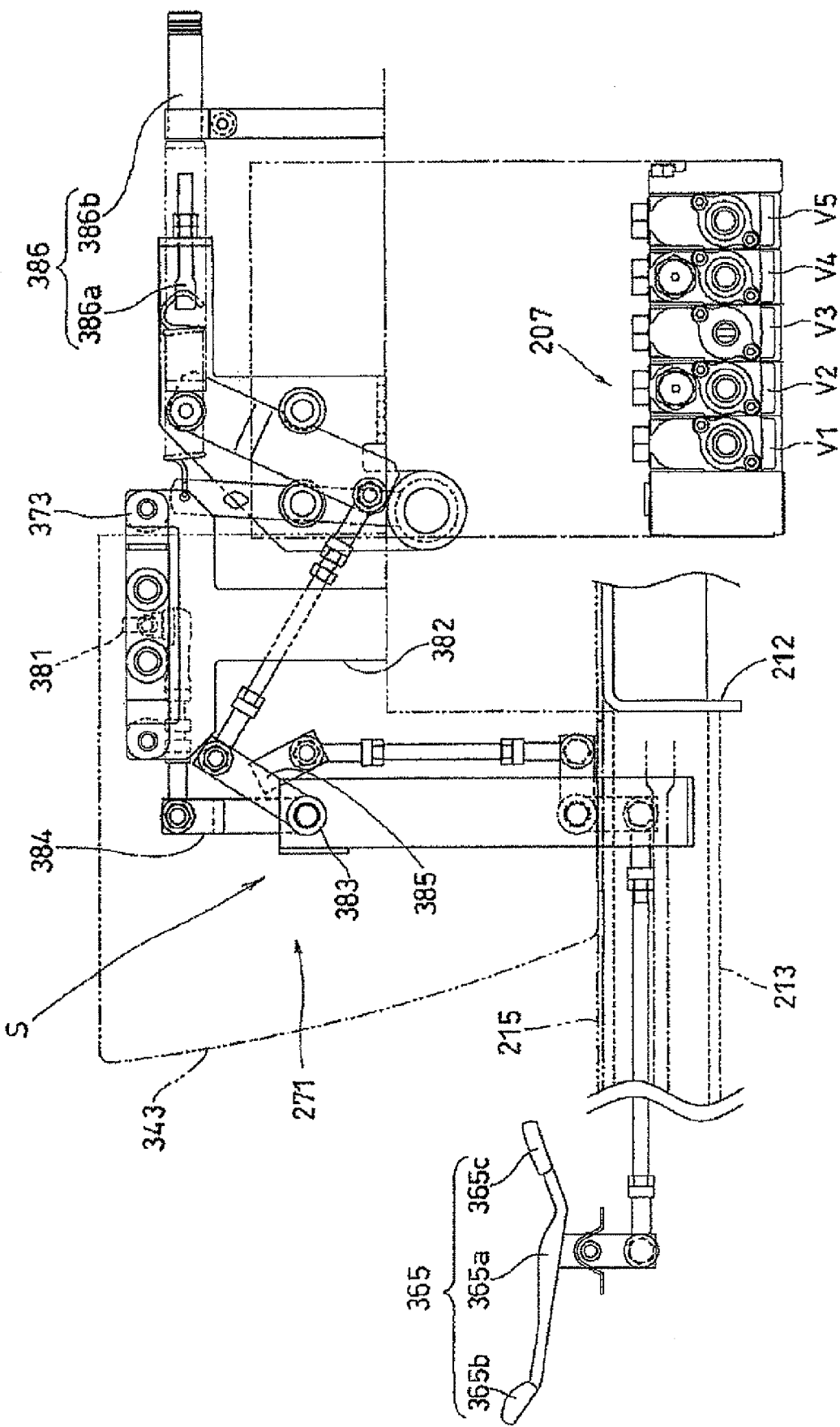
FIG. 27 is another left side view showing the area below the driver seat.

As shown in FIGS. 23 and 27, the forward/reverse switching pedal 365 is provided with an elongated pivoting body 365a in which the midportion is supported to allow pivoting about a left-right oriented support shaft; a front stepping part 365b provided to the front end part of the pivoting body 365a; and a rear stepping part 365c provided to the rear end part; and the forward/reverse switching pedal 365 is urged so as to be able to return to the middle position when front application or rear application is released.

As shown in FIGS. 22 and 23, the control valve 207 and an operating force relay part 371 of the steering device 202 are provided in the space S formed by the sub-cover 343 and the front wall 327, upper wall 328, and seat table 329 of the mounting table 322 below the driver seat 205 mounted on the seat table.

The operating force relay part 371 is provided with the master cylinder 372 and an operating tool thereof for operating the foot brake means 70, and the remote control valve (switching valve) 373 and an operating tool thereof for the HST.

As shown in FIG. 26, the master cylinder 372 is supported between the front wall 327 and the sub-cover 343 by an attachment member 374 that protrudes from the rotation table 201 in a state in which the longitudinal direction thereof is the vertical direction. The brake pedal 364 is connected to the master cylinder 372 via a plurality of link mechanisms, rods, and the like that constitute an operating tool. According to this configuration, the piston of the master cylinder 372 is pushed in by the application of the brake pedal 364, the oil pressure in the master cylinder 372 increases, the oil pressure is transmitted to the foot brake means 70 of the traveling body 2, and braking is applied to the rear wheels.

A brake oil tank 375 is provided beside the master cylinder 372, and an oil inflow port 375a of the brake oil tank 375 protrudes upward slightly from the small window 333a of the seat table 329.

A differential locking actuation means 377 for actuating the differential locking device 80 provided to the traveling body 2 is provided to the attachment member 374. The differential locking actuation means 377 is provided with a switching valve 378 capable of switching the differential locking device 80 on and off, and a differential locking lever 379 capable of operating the switching valve 378. One end of the differential locking lever 379 is connected to a rotating spool of the switching valve 378, and the other end extends to the area in front of the sub-cover 343 via a guide hole (not shown) formed in the sub-cover 343. The differential locking device 80 is turned on and operated by the pressing of the other end of the differential locking lever 379 by an operator seated in the driver seat 205. The differential locking lever 379 is urged so as to be able to return to the pre-application position when application thereof is withdrawn, and the differential locking device 80 is automatically changed from the on state to the off state by withdrawal of application.

As shown in FIG. 27, the remote control valve 373 for the HST is formed so that a pilot pressure is created in the forward travel port 52 or the reverse travel port 53 of the forward-reverse switching means 51 provided to the traveling body 2, the swash plate of the HST 35 is switched between the forward travel state and the reverse travel state, and the travel speed of the traveling body 2 can be adjusted. The upper surface of the remote control valve 373 is disposed in a position facing the opening 332 of the seat table 329 so that a pivoting spool 381 for controlling the pilot pressure can pivot in the front-rear direction of the rotation table 201, and the remote control valve 373 is supported by a bracket 382 provided upright on the upper wall 328 of the mounting table 322.

The forward/reverse switching pedal 365 is connected to the pivoting spool 381 of the remote control valve 373 via a plurality of link mechanisms, rods, and other components that constitute an operating tool. The operating tool is provided with a cylindrical member 383 rotated by the pivoting of the forward/reverse switching pedal 365 between the forward/reverse switching pedal 365 and the remote control valve 373. The cylindrical member 383 is provided with a first plate 384 for coupling and connecting the forward/reverse switching pedal 365 with the pivoting spool 381 of the remote control valve 373, and a second plate 385 for coupling and connecting the forward/reverse switching pedal 365 with a damper device 386 that are provided so as to protrude in the radial direction.

The damper device 386 is provided with a first damper 386a for front application, and a second damper 386b for rear application, and is disposed behind the remote control valve 373 and above the upper wall 328. The second plate 385 is connected to the first damper 386a and the second damper 386b at distal ends divided into two branches.

Through this configuration, when the front stepping part 365b of the forward/reverse switching pedal 365 is applied, the pivoting spool 381 of the remote control valve 373 is thereby pivoted in one direction via the operating tool, and the remote control valve 373 is placed in the forward application state. When application of the front stepping part 365b is released, the forward/reverse switching pedal 365 is thereby returned to the neutral position, but this return operation is performed gradually by the first damper 386a.

Through application of the rear stepping part 365c of the forward/reverse switching pedal 365, the pivoting spool 381 of the remote control valve 373 pivots in the other direction via the operating tool, and the remote control valve 373 is placed in the reverse application state. When application of the rear stepping part 365c is released, the forward/reverse switching pedal 365 is thereby returned to the neutral position, but this return operation is performed gradually by the second damper 386b.

As shown in FIGS. 23 and 27, the control valve 207 is provided to the rear of the HST remote control valve 373 and on the side of the damper device 386, and the upper surface of the control valve 207 faces the opening 332.

The control valve 207 controls the hydraulic actuators (the swivel motor 15, the boom cylinders 244, the arm cylinders 245, the bucket cylinder 246, and the rotation means 258) provided to the work machine. The control valve 207 is composed of a plurality of control valves composed of translation spool-shaped switching valves connected in the direction orthogonal to the sliding direction of the spool.

In the swiveling work machine 1 of the present embodiment, the HST remote control valve 373 as the operating force relay part 371, the operating tool of the remote control valve 373, the damper device 386, the master cylinder 372 for operating the foot brake means 70, the operating tool of the master cylinder 372, the brake oil tank 375, the differential locking actuation means 377, and the control valve 207 are provided in concentrated fashion in the space S below the driver seat 205 as described above.

Consequently, the amount of encroachment into the driver space by these devices and the operating tools for these device can be minimized. Since the remote control valve 373, the damper device 386, and the control valve 207 of the HST are provided in the position opposite the opening 332 of the seat table 329, inspection and maintenance of these devices can be performed easily and at once by setting the driver seat 205 to the forward-tilted state and unblocking the opening 332.

By setting the driver seat 205 in the forward-tilted state, the oil inflow port 375a of the brake oil tank 375 that protrudes from the small window 333a of the seat table 329 is also exposed, and oil can be injected into the brake oil tank 375.

Furthermore, since the master cylinder 372, the brake oil tank 375, and the differential locking actuation means 377 are provided to the rear of the sub-cover 343, inspection and maintenance of these devices can be performed easily and at once by removing the sub-cover 343.

Figure 31:
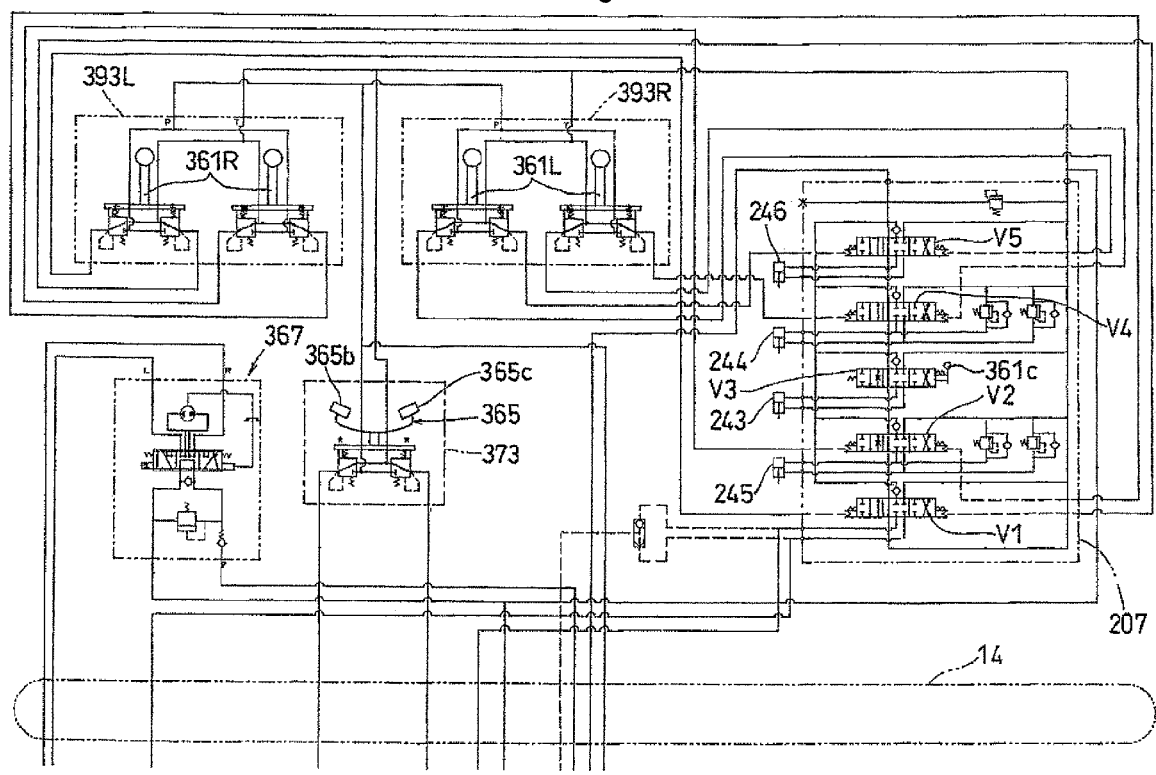
FIG. 31 shows the hydraulic circuit on the side of the rotating body.

FIGS. 30 and 31 show the hydraulic oil circuit of the swiveling work machine 1 according to the present embodiment. This hydraulic oil circuit is divided into a traveling body side (FIG. 30) and a rotation table side (FIG. 31) with the swivel joint 14 as the boundary.

The power of the engine 7 can drive the charge pump 79 and the main pump 68 at the same time that the hydraulic pump 46 of the HST 35 is driven.

The operating oil from the main pump 68 driven by the power of the engine 7 is also fed to the control valve 207 via the swivel joint 14 and sent to each actuator from the control valves V1 through V5 of the control valve 207.

In the control valve 207, V1 is a swiveling control valve for controlling the swivel motor 15, V2 is an arm control valve for controlling the arm cylinders 245, V3 is a bucket rotation control valve for controlling the rotation means 258 of the bucket 243, V4 is a boom control valve for controlling the boom cylinders 244, and V5 is a bucket control valve for controlling the bucket cylinder 246.

A remote control valve 393L for arms and swiveling is provided to the left operating lever 361L of the operating devices 206. The arm cylinders 245 scoop and dump via the arm control valve V1 by the forward and backward pivoting of the left operating lever 361L. The swivel motor 15 rotates left and right via the swivel control valve V2 by the pivoting of the left operating lever 361L to the left and right.

A remote control valve 393R for the bucket and the booms is provided to the right operating lever 361R, and the bucket 243 tilts and dumps via the attachment tool control valve V5 by forward and backward pivoting of the operating levers 361. By the left and right pivoting of the right operating lever 361R, the boom cylinders 244 raise and lower via the boom control valve V4.

Pressure oil is fed to the rotation means 258 of the bucket 243 via the bucket rotation control valve V3 through the use of a bucket rotation lever 394 provided to the rear of the left operating lever 361L, and the bucket 243 is thereby rotated.

In the present embodiment, the swivel control valve V1, the arm control valve V2, the arm control valve V4, and the bucket control valve V5 are composed of pilot-operated switching valves operated by a pilot pressure, as in the case of the remote control valves 393L, 393R, and the bucket rotation control valve V3 is composed of the manually operated switching valve 378 operated by manual operation, but the control valves V1 through V5 may all be composed of pilot-operated switching valves.

The operating oil of the main pump 68 is fed to the steering cylinder 97 through the power steering controller 367.

As shown in FIG. 30, a forward/reverse conversion means 401 is provided to pilot oil channels 395a, 395b for connecting the forward-reverse switching means 51 and the remote control valve 373 for the HST. The forward/reverse conversion means 401 detects the rotation of the rotation table 201 from the forward orientation to the rearward orientation, and the forward/reverse conversion means 401 is provided for reversing the switching operation of the forward-reverse switching means 51 by the forward/reverse switching pedal 365.

Figure 28:
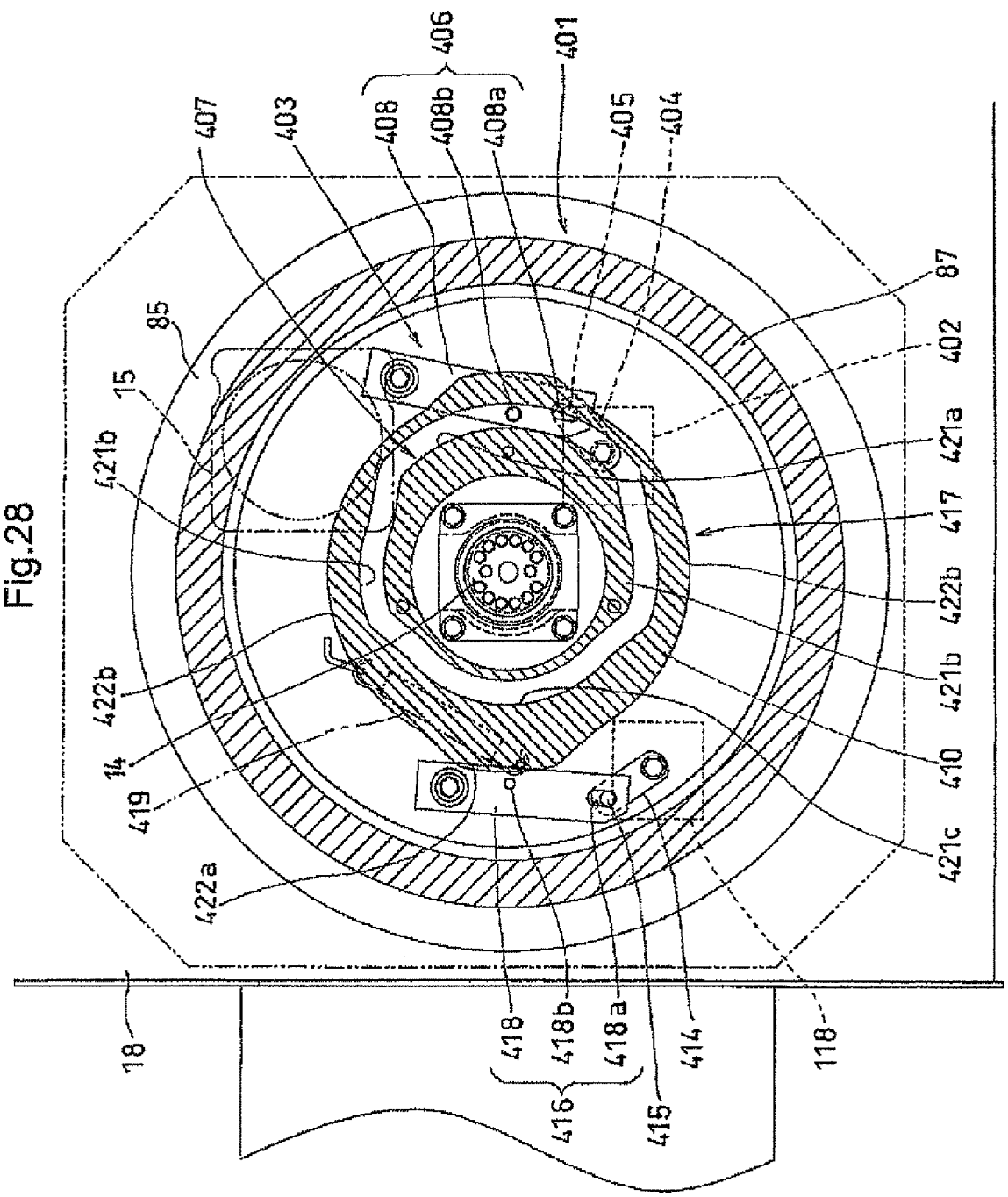
FIG. 28 is a front view showing the rotation axis and the surrounding area.

As shown in FIGS. 28 and 30, the forward/reverse conversion means 401 is provided with a four-port three-position switch valve 402 capable of switching the pilot oil channels 395a, 395b between the forward-reverse switching means 51 and the remote control valve 373 for the HST and feeding the pressure oil from the remote control valve 373 to the forward-reverse switching means 51; and a detection mechanism 403 for detecting the rotation state of the rotation table 201 and switching a rotation spool 402a of the switch valve 402 between three positions.

As shown in FIGS. 28 and 29, the switch valve 402 is formed by a rotary valve having the rotation spool 402a, and is provided below the upper wall 18 of the main frame 9 of the traveling body 2. An operating tab 404 that protrudes in the radial direction from a rotation shaft is provided to the upper end of the rotation spool 402a so as to protrude further upward than the upper wall 18, and a pin 405 is provided in protruding fashion to the distal end of the operating tab 404.

In the switch valve 402, when the rotation spool 402a is placed in position A (forward connection state) as shown in FIG. 30, the remote control valve 373 and the forward-reverse switching means 51 are connected in a forward connection state, the pressure oil from a forward travel port 373a of the remote control valve 373 is fed to the forward travel port 52 of the forward-reverse switching means 51, and the pressure oil from the reverse travel port 373b of the remote control valve 373 is fed to the reverse travel port 53 of the forward-reverse switching means 51. Accordingly, the traveling body 2 travels forward when the front stepping part 365b of the forward/reverse switching pedal 365 is applied, and the traveling body 2 travels in reverse when the rear stepping part 365c of the forward/reverse switching pedal 365 is applied.

When the rotation spool 402a of the switch valve 402 is placed in position B (neutral state), the supply of pressure oil from the remote control valve 373 to the forward-reverse switching means 51 is interrupted, whereby the traveling body 2 can no longer travel by operation of the forward/reverse switching pedal 365.

When the rotation spool 402a of the switch valve 402 is placed in position C (reverse connection state), the remote control valve 373 and the forward-reverse switching means 51 are connected in a reverse connection state, the pressure oil from the forward travel port 373a of the remote control valve 373 is fed to the reverse travel port 53 of the forward-reverse switching means 51, and the pressure oil from the reverse travel port 373b of the remote control valve 373 is fed to the forward travel port 52 of the forward-reverse switching means 51. Accordingly, the traveling body 2 travels in reverse when the front stepping part 365b of the forward/reverse switching pedal 365 is applied, and the traveling body 2 travels forward when the rear stepping part 365c of the forward/reverse switching pedal 365 is applied.

As shown in FIG. 28, the detection mechanism 403 is provided with a detection arm 406 provided on the side of the traveling body 2, and a detection cam 407 provided on the side of the rotation table 201 for operating the detection arm 406.

The detection arm 406 is provided with an elongated pivoting tab 408, one end part of the pivoting tab 408 is pivotably supported by the upper wall 18 of the main frame 9 of the traveling body 2, an elongated hole 408a is formed in the other end part of the pivoting tab 408, and the pin 405 of the operating tab 404 is inserted into the elongated hole 408a.

Through this configuration, the operating tab 404 is pivoted by the pivoting of the detection arm 406, and the rotation spool 402a rotates in conjunction with the pivoting of the operating tab 404. A roller 408b is also provided in a midportion in the longitudinal direction of the detection arm 406 so as to protrude toward the rotation table 201.

In the inside of the inner race 87 of the rotation bearing 16 provided to the lower wall 214 of the rotation table 201, a cam formation member 410 is provided in a state in which the center or rotation thereof coincides with the rotation axis X of the rotation table 201. The detection cam 407 is formed as a cam groove in the cam formation member 410. The cam groove has a shape in which three arcs having different diameters are gradually connected, and the roller 408b of the detection arm 406 comes in contact with the inner surface of the cam groove.

An operating means 411 for operating the rocking lock mechanism 112 is provided between the rotation table 201 and the machine frame 6 of the traveling body 2.

As shown in FIGS. 28 and 29, the switch valve 118 of the rocking lock mechanism 112 is formed by a rotary valve having a rotation spool 412a, and is provided below the upper wall 18 of the main frame 9 of the traveling body 2. An operating tab 414 that protrudes in the radial direction from a rotation shaft is provided to the upper end of the rotation spool 412a so as to protrude further upward than the upper wall 18, and a pin 415 is provided in protruding fashion to the distal end of the operating tab 414.

In the switch valve 118, the rotation spool 412a is placed in position A, whereby the communicating oil channel that communicates the two chambers 124A, 124B formed in the cylinder tube 116 of the rocking lock mechanism 112 are connected, and the two chambers 124A, 124B are communicated with each other. The fluid in the circuit can thereby freely flow in and out of the two chambers. Consequently, the rocking lock mechanism 112 is released, and the front-wheel axle case 96 pivots according to the state of the road surface.

The rotation spool 402a of the switch valve 402 is placed in position B, whereby the communicating oil channel is no longer communicated, and the chambers 124A, 124B of the cylinder tube 116 are blocked. The pressure oil in the hydraulic circuit is thereby prevented from moving from one chamber 124A to the other chamber 124B. The rocking lock mechanism 112 is thereby activated, and the front-wheel axle case 96 is supported so as to be unable to pivot.

The operating means 411 is provided with an operating arm 416 provided on the side of the traveling body, and an operating cam 417 for operating the operating arm 416 that is provided on the side of the rotation table.

The operating arm 416 has substantially the same configuration as the detection arm 406, and is provided with an elongated pivoting tab 418. One end of the pivoting tab 418 is pivotably supported by the upper wall 18 of the main frame 9 of the traveling body 2, and the pin 415 of the operating tab 414 is inserted in an elongated hole 418a formed in the other end of the pivoting tab 418. A roller 418b is provided in a midportion in the longitudinal direction of the operating arm 416 so as to protrude toward the rotation table 201.

The operating cam 417 is formed by a cam surface formed on the external peripheral surface in the cam formation member 410, the cam surface has a shape in which two arcs having different diameters are gradually connected, and the roller 418b of the operating arm 416 is in contact with the cam surface.

The operating arm 416 is urged toward the rotation axis X by a tension spring 419 in order to maintain the contact of the roller 418b with the cam surface.

The operating arm 416 is provided in a position in which the roller 418b thereof is directly opposite the roller 408b of the detection arm 406 via the rotation axis X, and a straight line that connects the center axis of the roller 418b of the operating arm 416, the rotation axis X, and the center axis of the roller 408b of the operating arm 416 coincides with a center axis extending in the front-rear direction of the traveling body 2.

The operation of the forward/reverse conversion means 401 and the operating means 411 will be described using FIG. 29.

First, as shown in FIG. 29A, when the directions of the traveling body 2 and rotating body 3 coincide, and the rotation angle of the rotating body 3 in relation to the traveling body 2 is 0° (forward orientation), the roller 408b of the detection arm 406 of the forward/reverse conversion means 401 comes in contact with the large-diameter groove part 421a of the detection cam 407, and the roller 418b of the operating arm 416 of the operating means 411 comes in contact with one large-diameter surface part 422a of the operating cam 417.

At this time, the detection arm 406 is pivoted in one direction, whereby the rotation spool 402a of the switch valve 402 is set to position A, and the remote control valve 373 and the forward-reverse switching means 51 are connected in the forward connection state. Accordingly, the traveling body 2 is caused to travel forward when the front stepping part 365b of the forward/reverse switching pedal 365 is applied in this state, and although it is the traveling body 2 that actually travels forward, the swiveling work machine 1 travels forward from the perspective of the operator seated in the driver seat 205.

At this timer the operating arm 416 is pivoted in one direction, whereby the rotation spool 412a of the switch valve 118 is set in position A, the two chambers 124A, 124B of the cylinder tube 116 are communicated with each other, and the rocking lock mechanism 112 is released. The front-wheel axle case 96 is thereby free to pivot, the pair of left and right front wheels 4 move up and down in accordance with the road conditions, and the orientation of the swiveling work machine 1 is stabilized during travel.

The state of contact of the detection cam 407 with the large-diameter groove part 421a of the detection cam 407, and the state of contact of the operating cam 417 with one large-diameter surface part 422a of the operating cam 417 are maintained when the pivot angle of the rotating body 3 is within a front pivot range that includes the range form the forward orientation to prescribed pivot angles in the left-right direction.

When the rotating body 3 is pivoted until the pivot angle exceeds the front pivot range, the directions of the traveling body 2 and the rotating body 3 are orthogonal to each other as shown in FIG. 29B, for example, and the pivot angle of the rotating body 3 in relation to the traveling body 2 is 90°, the roller 408b of the detection arm 406 comes in contact with a mid-diameter groove part 421b of the detection cam 407, and the roller 418b of the operating arm 416 comes in contact with a small-diameter surface part 422b of the operating cam 417.

At this time, the detection arm 406 pivots to a middle state from the state of pivoting in one direction, whereby the rotation spool 402a of the switch valve 402 is set in position B, and the connection between the remote control valve 373 and the forward-reverse switching means 51 is blocked. Accordingly, the traveling body 2 does not travel when the front stepping part 365b or the rear stepping part 365c of the forward/reverse switching pedal 365 is applied in this state.

At this time, the operating arm 416 is pivoted in the other direction, whereby the rotation spool 412a of the switch valve 118 is set in position B, the two chambers 124A, 124B of the cylinder tube 116 are non-communicated, and the rocking lock mechanism 112 is activated, whereby the front-wheel axle case 96 is made unable to pivot. At this time, since the traveling body 2 is unable to travel, the front-wheel axle case 96 is fixed in a state in which the pair of left and right front wheels are in contact with the road surface and receive substantially the same amount of pressure against the ground, and the orientation of the immobile swiveling work machine 1 is thereby stabilized.

The state of contact of the detection arm 406 with the mid-diameter groove part 421b of the detection cam 407, and the state of contact of the operating arm 416 with the small-diameter surface part 422b of the operating cam 417 are maintained when the rotation angle of the rotating body 3 is within a middle rotation range that includes a prescribed range of rotation angles outside the front rotation range.

When the rotating body 3 is pivoted until the pivot angle exceeds the middle pivot range, the directions of the traveling body 2 and the rotating body 3 are opposite each other as shown in FIG. 29C, for example, and the pivot angle of the rotating body 3 in relation to the traveling body 2 is 180°, the roller 408b of the detection arm 406 comes in contact with a small-diameter groove part 421c of the detection cam 407, and the roller 408b of the operating arm 416 comes in contact with the other large-diameter surface part 422a in the opposite direction from the large-diameter surface part 422a of the operating cam 417.

At this time, the detection arm 406 pivots in the other direction from the middle state, whereby the rotation spool 402a of the switch valve 402 is set in position C, and the remote control valve 373 and the forward-reverse switching means 51 are connected in the reverse connection state. Accordingly, the traveling body 2 is operated so as to travel in reverse by applying the front stepping part 365b of the forward/reverse switching pedal 365 in this state, and although the traveling body 2 travels in reverse, the swiveling work machine 1 travels forward from the perspective of the operator seated in the driver seat 205.

The operating arm 416 is pivoted in one direction, whereby the rotation spool 412a of the switch valve 118 is set in position A, the two chambers 124A, 124B of the cylinder tube 116 are communicated with each other, and the rocking lock mechanism 112 is released.

The state of contact of the detection arm 406 with the small-diameter groove part 421c of the detection cam 407, and the state of contact of the operating arm 416 with the other large-diameter surface part 422a of the operating cam 417 are maintained when the rotation angle of the rotating body 3 is set within the rear rotation range that includes a prescribed range of rotation angles outside the middle rotation range.

Specifically, according to the rotation angle of the rotating body 3, the rotating body 3 is positioned in any rotation range of the front rotation range, the rear rotation range, and the pair of middle rotation ranges provided between the front and rear rotation ranges, the forward/reverse travel operation of the forward/reverse switching pedal 365 is switched (inverted), and the rocking lock mechanism 112 is switched according to the rotation range in which the rotating body 3 is positioned.

Through this configuration, there is no need to switch the application of the forward/reverse switching pedal 365 according to whether the rotating body 3 is in the forward orientation or the rear orientation. When the front stepping part 365b of the forward/reverse switching pedal 365 is applied, the swiveling work machine 1 travels forward as viewed from the perspective of the operator seated in the driver seat 205, and when the rear stepping part 365c is applied, the swiveling work machine 1 travels in reverse as viewed from the perspective of the operator.

The forward connection state of the forward/reverse conversion means 401 and the non-operating state of the operating means 411 of the rocking lock mechanism 112 are maintained while the rotation angle of the rotating body 3 is in the front rotation range. Therefore, even when the rotating body 3 is rotated in a prescribed angle range from the forward orientation, there is no switching of the level of the forward/reverse conversion means 401 and the forward/reverse conversion means 401. The same applies when the rotating body 3 is in the rear rotation range.

There is a middle rotation range in which the switch valve 402 of the forward/reverse conversion means 401 is placed in a neutral state between the front rotation angle range for the forward connection state and the rear rotation angle range for the reverse connection state. According to this configuration, even when the rotation table 201 is moved back and forth between the forward orientation and the reverse orientation, there is no tendency for the forward/reverse travel operation to be inverted by the forward/reverse switching pedal 365 at a certain boundary, and the forward/reverse switching pedal 365 is switched between forward and reverse travel through a neutral state in which travel by the traveling body 2 is impossible. Therefore, operating errors caused by forward/reverse travel operation of the forward/reverse switching pedal 365 during work is prevented.

When the rotation angle of the rotating body 3 is within the middle rotation range, the rocking lock mechanism 112 is operated, and pivoting of the front-wheel axle case 96 is restricted. Consequently, when the rotating body 3 is rotated to perform work, although the center of gravity moves according to the rotation of the rotating body 3, the front-wheel axle case 96 does not pivot according to the movement of the center of gravity. Therefore, the rotation table 201 does not pivot relative to the wheel axis case, and a stable work orientation is maintained during work. Through the operation of the rocking lock mechanism 112, the front and rear wheels 4, 5 make contact with the road surface in a state of substantially equal ground contact pressure. Therefore, even when a large lateral force or moment acts on the traveling body 2 in conjunction with rotation of the rotation table 201 during work, these forces can be resisted by all of the front and rear wheels 4, 5 that support the traveling body 2, and a stable work orientation is maintained during work.

As shown in FIGS. 30 and 31, a steering conversion means 425 having substantially the same structure as the forward/reverse conversion means 401 is provided between the power steering controller 367 and the steering cylinder 97. The connection state of the steering cylinder 97 with the power steering controller 367 is thereby switched according to the rotation angle of the rotating body 3. Consequently, when the rotation angle of the rotating body 3 is within the front rotation range, the steering conversion means 425 is placed in the forward connection state, and the traveling body 2 is turned to the right when the steering wheel 363 is turned to the right.

When the rotation angle of the rotating body 3 is within the middle rotation range, the steering conversion means 425 is placed in the neutral state, and the traveling body 2 cannot rotate according to the operation of the steering wheel 363.

When the rotation angle of the rotating body 3 is within the rear rotation range, the steering conversion means 425 is placed in the reverse connection state, and the traveling body 2 is turned to the right when the steering wheel 363 is turned to the right. At this time, the direction in which the steering wheel 363 is turned, and the turn direction of the traveling body 2 are the same as viewed from the perspective of the operator seated in the driver seat 205, and operating errors due to steering wheel operation during work is prevented.

An embodiment of the present invention was described in detail, but the present invention is not limited by the embodiment described above. For example, the same effects as the embodiment of the present invention are demonstrated when the pair of left and right rear wheels 5 are pivotably supported by the traveling body 2 via a wheel axle case as in the case of the left and right front wheels 4. Specifically, the wheel axle case and the rocking lock mechanism 112 of the present embodiment may be provided to one or both of the left and right front wheels 4 and the left and right rear wheels 5.

The same effects as those of the present embodiment are also demonstrated when the detection arm 406 of the detection mechanism 403 is provided on the side of the rotating body 3, and the detection cam 407 is provided on the side of the traveling body 2. The effects of the present embodiment are also demonstrated when the operating arm 416 of the operating mechanism is provided on the side of the rotating body 3, and the operating cam 417 is provided on the side of the traveling body 2.

A configuration may also be adopted in which a hand accelerator lever is provided to the steering device 202, and the speed of the engine 7 is adjusted by the hand accelerator lever according to the type of work performed by the ground implement.

A configuration may also be adopted in which a travel lock valve is provided between the charge pump and the remote control valve 373 to stop the pilot pressure from being fed to the remote control valve 373 from the charge pump.

The embodiment above was described using the example of a wheeled work machine provided with a rotation table 201 and an excavating implement 203, a driver seat 205, and other components provided on the rotation table 201, but the rotation table 201 is not an essential constituent element. For example, a different configuration may be adopted in which the excavating implement 203, the driver seat 205, and other components are provided directly to the traveling body 2.

INDUSTRIAL APPLICABILITY

The present invention can be utilized in a wheeled work machine in which an engine is mounted at the rear of a machine frame supported by front and rear wheels, and the wheeled work machine is provided with a traveling body having a traveling system power transmission mechanism for transmitting power from the engine to the rear wheels.

The invention claimed is:

1. A wheeled work machine comprising:
   a machine frame;
   an axle case for suspending wheels that is supported by said machine frame so as to be able to rock;
   a rocking lock mechanism for restricting rocking of said axle case;
   wherein an operation body that integrally rocks with the axle case is provided at a center in a left-right direction of said axle case;
   wherein said rocking lock mechanism has a lock cylinder and a switchover valve for switching both cylinder chambers of said lock cylinder between a communicated state and a closed state;
   a piston rod of said lock cylinder extends horizontally and is fixed to the machine frame, and a cylinder tube of said lock cylinder is horizontally movable;
   a fitting part on said operation body; and
   a fitted part on said cylinder tube of said lock cylinder, wherein said cylinder tube of said lock cylinder is operably connected to said operation body by fitting said fitted part with said fitting part.

2. A wheeled work machine comprising:
   a machine frame;
   an axle case for suspending wheels that is supported by said machine frame so as to be able to rock;
   a rocking lock mechanism for restricting rocking of said axle case;
   wherein an operation body that integrally rocks with the axle case is provided at a center in a left-right direction of said axle case;
   wherein said rocking lock mechanism has a lock cylinder and a switchover valve for switching both cylinder chambers of said lock cylinder between a communicated state and a closed state;
   a piston rod of said lock cylinder extends horizontally and is fixed to the machine frame, and a cylinder tube of said lock cylinder is operably connected to said operation body;
   a rotation table rotatably supported by said machine frame; and
   operating means for operating said rocking lock mechanism when the rotation table is rotated to a prescribed angle from a front-rear orientation, the operating means being provided between said rocking lock mechanism and said rotation table.

3. The wheeled work machine according to claim 2, wherein said operating means has:
   an operating arm that is provided to any one of said machine frame and said rotation table, and that operates said rocking lock mechanism by rocking; and
   an operating cam that is provided to the other of said machine frame and said rotation table, and that rocks said operating arm when the rotation table is rotated a prescribed angle from the front-rear orientation.

4. The wheeled work machine according to claim 1, wherein said fitting part comprises an upward opening cutout.

5. The wheeled work machine according to claim 1, wherein said fitted part comprises a pin formed to be received in the upward opening cutout.

6. The wheeled work machine according to claim 5, wherein said pin extends in a front-rear direction of the wheeled work machine.

* * * * *